(12) United States Patent
Hsu et al.

(10) Patent No.: US 8,514,499 B2
(45) Date of Patent: Aug. 20, 2013

(54) OPTICAL IMAGE CAPTURING LENS ASSEMBLY

(75) Inventors: Po-Lun Hsu, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/569,172

(22) Filed: Aug. 7, 2012

(65) Prior Publication Data
US 2013/0070346 A1 Mar. 21, 2013

(30) Foreign Application Priority Data
Sep. 15, 2011 (TW) .............................. 100133242 A

(51) Int. Cl.
G02B 13/18 (2006.01)
G02B 9/62 (2006.01)

(52) U.S. Cl.
USPC .......................................... 359/713; 359/756

(58) Field of Classification Search
USPC .......................................... 359/708, 713, 756
See application file for complete search history.

(56) References Cited

U.S. PATENT DOCUMENTS
7,365,920 B2 4/2008 Noda
8,351,136 B2 * 1/2013 Tsai et al. ..................... 359/772

* cited by examiner

Primary Examiner — Scott J Sugarman
(74) Attorney, Agent, or Firm — CKC & Partners Co., Ltd.

(57) ABSTRACT

An optical image capturing lens assembly includes, in order from an object side to an image side, the first lens element with positive refractive power having a convex object-side surface, the second lens element with refractive power, the third lens element with refractive power, the fourth lens element with refractive power having a concave object-side surface and a convex image-side surface, the fifth lens element with refractive power having a convex image-side surface, the object-side surface and the image side surface of the fifth lens element being aspheric, and the sixth lens element with negative refractive power made of plastic material and having a concave image-side surface. The object-side surface and the image-side surface of the sixth lens element are aspheric, and at least one surface thereof has at least one inflection point.

25 Claims, 16 Drawing Sheets

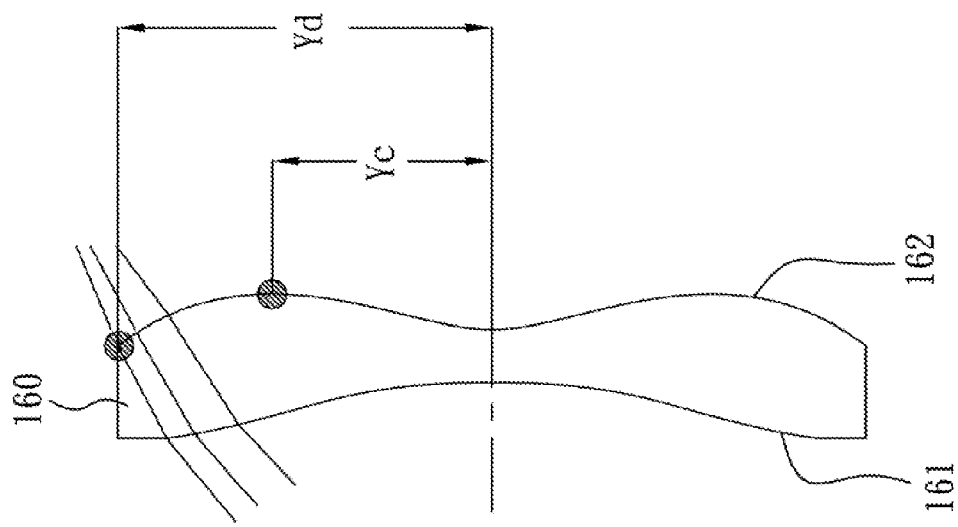

OPTICAL IMAGE CAPTURING LENS ASSEMBLY

RELATED APPLICATIONS

The application claims priority to Taiwan Application Serial Number 100133242, filed Sep. 15, 2011, which is herein incorporated by reference.

BACKGROUND

1. Technical Field

The present invention relates to an optical image capturing lens assembly. More particularly, the present invention relates to a compact optical image capturing lens assembly applicable to electronic products.

2. Description of Related Art

In recent years, with the popularity of mobile products with camera functionalities, the demand for miniaturizing an optical lens assembly is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact optical lens assemblies have gradually evolved toward the field of higher megapixels, there is an increasing demand for optical lens assemblies featuring better image quality.

A conventional compact optical lens assembly employed in a portable electronic product mainly adopts a four-element lens structure. Due to the popularity of mobile products with high-end specifications, such as smart phones and PDAs (Personal Digital Assistants), the pixel and image-quality requirements of the compact optical lens assembly have increased rapidly. However, the conventional four-element lens structure cannot satisfy the requirements of the compact optical lens assembly. Furthermore, the trend in modern electronics is developed toward increasingly higher performance and compact size. Therefore, a need exists in the art for providing an optical lens assembly for use in a mobile electronic product that has excellent imaging quality without too long total track length.

SUMMARY

According to one aspect of the present disclosure, an optical image capturing lens assembly includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has refractive power. The fourth lens element with refractive power has a concave object-side surface and a convex image-side surface. The fifth lens element with refractive power has a convex image-side surface, wherein an object-side surface and the mage-side surface of the fifth lens element are aspheric. The sixth lens element with negative refractive power is made of plastic material and has a concave image-side surface, wherein an object-side surface and the image-side surface of the sixth lens element are aspheric, and the sixth lens element has at least one inflection point formed on at least one of the object-side surface and the image-side surface thereof. Wherein, a distance in parallel with an optical axis from a maximum effective diameter position to an axial vertex on the image-side surface of the fourth lens element is SAG42, a central thickness of the fourth lens element is CT4, a distance perpendicular to the optical axis between a non-axial critical point on the image-side surface of the sixth lens element and the optical axis is Yc, and a distance perpendicular to the optical axis between the maximum effective diameter position and the optical axis is Yd, the following relationships are satisfied:

$-5.0 < SAG42/CT4 < -1.4$; and $0.2 < Yc/Yd < 0.9$.

According to another aspect of the present disclosure, an optical image capturing lens assembly includes, in order from an object side to an image side, a first lens element, a second lens element, a third lens element, a fourth lens element, a fifth lens element and a sixth lens element. The first lens element with positive refractive power has a convex object-side surface. The second lens element has negative refractive power. The third lens element has refractive power. The fourth lens element has refractive power. The fifth lens element with positive refractive power is made of plastic material, wherein an object-side surface and an image-side surface of the fifth lens element are aspheric. The sixth lens element with negative refractive power is made of plastic material and has a concave image-side surface, wherein an object-side surface and the image-side surface of the sixth lens element are aspheric, and the sixth lens element has at least one inflection point formed on at least one of the object-side surface and the image-side surface thereof. Wherein the first through sixth lens elements are six independent and non-cemented lens elements, a focal length of the optical image capturing lens assembly is f, an entrance pupil diameter of the optical image capturing lens assembly is EPD, a distance perpendicular to the optical axis between a non-axial critical point on the image-side surface of the sixth lens element and the optical axis is Yc, and a distance perpendicular to the optical axis between the maximum effective diameter position and the optical axis is Yd, the following relationships are satisfied:

$1.5 < f/EPD < 2.5$; and $0.2 < Yc/Yd < 0.9$.

According to yet another aspect of the present disclosure, an optical image capturing lens assembly includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has refractive power. The fourth lens element with refractive power has a concave object-side surface and a convex image-side surface. The fifth lens element with refractive power is made of plastic material and has a convex image-side surface, wherein an object-side surface and the image-side surface of the fifth lens element are aspheric. The sixth lens element with negative refractive power is made of plastic material and has a concave image-side surface, wherein an object-side surface and the image-side surface of the sixth lens element are aspheric, and the sixth lens element has at least one inflection point formed on at least one of the object-side surface and the image-side surface thereof. Wherein the first through sixth lens elements are six independent and non-cemented lens elements, a curvature radius of the object-side surface of the fourth lens element is R7, a curvature radius of the image-side surface of the fourth lens element is R8, a distance perpendicular to the optical axis between a non-axial critical point on the image-side surface of the sixth lens element and the optical axis is Yc, and a distance perpendicular to the optical axis between the maximum effective diameter position and the optical axis is Yd, the following relationships are satisfied:

$$-0.3 < (R7-R8)/(R7+R8) < -0.05;\text{ and}$$

$$0.2 < Yc/Yd < 0.9.$$

BRIEF DESCRIPTION OF THE DRAWINGS

The present disclosure can be more fully understood by reading the following detailed description of the embodiment, with reference made to the accompanying drawings as follows:

FIG. 16 shows the sixth lens element of the optical image capturing lenses according to the 1st embodiment of the present disclosure.

DETAILED DESCRIPTION

Figure 1:
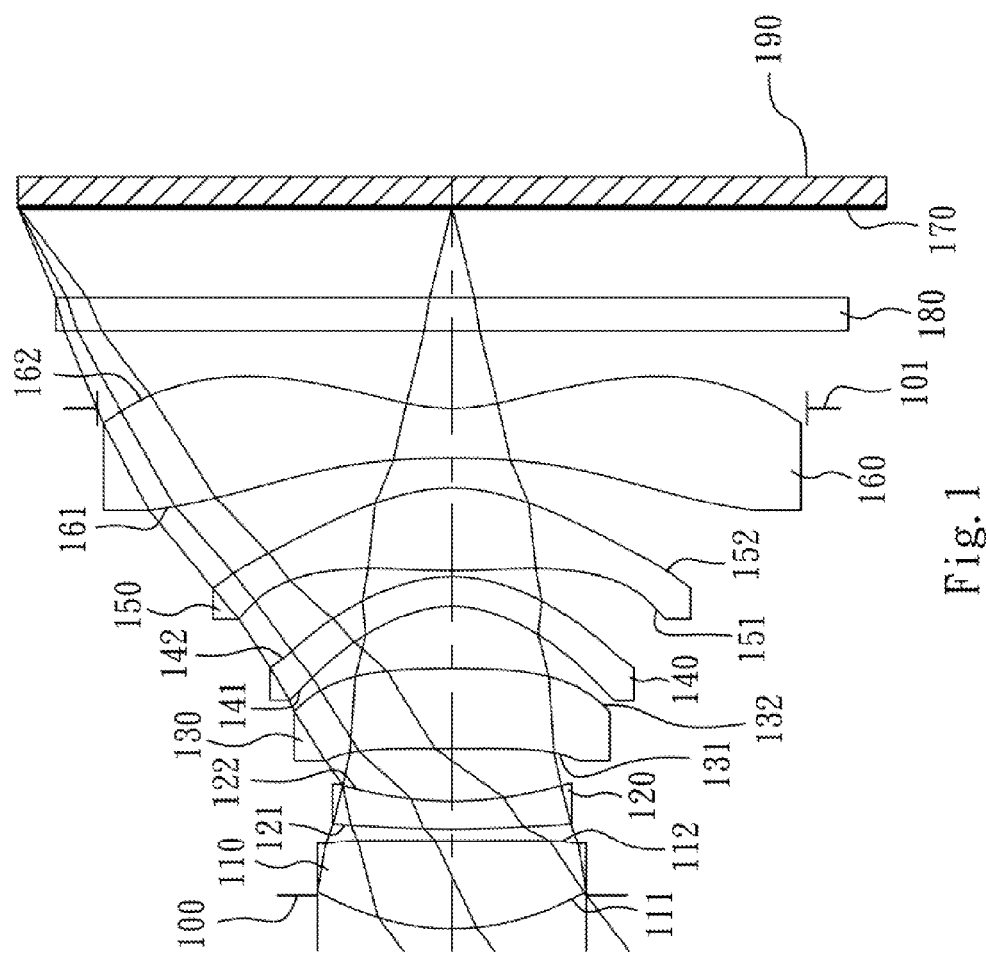
FIG. 1 is a schematic view of an optical image capturing lens assembly according to the 1st embodiment of the present disclosure.

An optical image capturing lens assembly includes, in order from an object side to an image side, a first lens element, a second lens element, a third lens element, a fourth lens element a fifth lens element and a sixth lens element. The optical image capturing lens assembly further includes an image sensor located on an image plane.

The first through sixth lens elements are six independent and non-cemented lens elements. That is, any two lens elements adjacent to each other are not cemented, and there is an air space between the two lens elements. The manufacture of the cemented lenses is more complex than the manufacture of the non-cemented lenses. Especially, the cemented surfaces of the two lens elements should have accurate curvatures for ensuring the connection between the two lens elements, and the displacement between the cemented surfaces of the two lens elements during cementing the lens elements may affect the optical quality of the optical image capturing lens assembly. Therefore, the optical image capturing lens assembly of the present disclosure provides six independent and non-cemented lens elements for improving the problem generated by the cemented lens elements.

The first lens element with positive refractive power has a convex object-side surface for providing partial refractive power, so that the total track length of the optical image capturing lens assembly can be reduced so as to maintain the compact size thereof.

The second lens element with negative refractive power has a concave image-side surface. Therefore, the aberration generated from the first lens element with positive refractive power can be corrected.

The third lens element has positive refractive power, so that the sensitivity of the optical image capturing lens assembly can be reduced by cooperate to the first lens element.

The fourth lens element with negative refractive power has a concave object-side surface and a convex image-side surface. Therefore, the aberration of the optical image capturing lens assembly can be corrected.

The fifth lens element with positive refractive power is made of plastic, and has a convex object-side surface and a convex image-side surface. Therefore, the high order aberration of the optical image capturing lens assembly can be corrected, and excellent image quality is obtained.

The sixth lens element with negative refractive power is made of plastic, and has a concave object-side surface and a concave image-side surface. Therefore, a principal point of the optical image capturing lens assembly can be positioned away from the image plane, and the total track length of the optical image capturing lens assembly can be reduced so as to maintain the compact size thereof. Moreover, the sixth lens element has at least one inflection point formed on at least one surface thereof, so that the incident angle of the off-axis field on the image sensor can be effectively minimized and the aberration can be corrected as well.

When a distance in parallel with an optical axis from a maximum effective diameter position to an axial vertex on the image-side surface of the fourth lens element is SAG42 and a central thickness of the fourth lens element is CT4, the following relationship is satisfied: $-5.0 < SAG42/CT4 < -1.4$. Therefore, the shape of the image-side surface of the fourth lens element and the thickness of the fourth lens element are proper, so that the fabrication of the optical image capturing lens assembly can be improved.

Furthermore, SAG42 and CT4 can satisfy the following relationship: $-4.5 < SAG42/CT4 < -1.7$.

When a distance perpendicular to the optical axis between a non-axial critical point on the image-side surface of the sixth lens element and the optical axis is Yc, and a distance perpendicular to the optical axis between the maximum effective diameter position and the optical axis is Yd, the following relationship is satisfied: $0.2<Yc/Yd<0.9$. Therefore, the sufficient angle of view of the optical image capturing lens assembly can be further ensured, and the incident angle of the off-axis field of light on the image sensor can be effectively minimized and the aberration of the off-axis field can be corrected.

Furthermore, Yc and Yd can satisfy the following relationship: $0.45<Yc/Yd<0.70$.

When a focal length of the optical image capturing lens assembly is f, a focal length of the fifth lens element is f5, and a focal length of the sixth lens element is f6, the following relationship is satisfied: $3.0<|f/f5|+|f/f6|<6.5$. Therefore, the refractive power of the fifth lens element and the sixth lens element are proper, so that the high order aberration of the optical image capturing lens assembly can be corrected for enhancing the resolution thereof. Moreover, the fifth lens element with positive refractive power and the sixth lens element with negative refractive power can provide telephoto characteristic for reducing the back focal length of the optical image capturing lens assembly, so that the total tract length thereof can be reduced.

When a curvature radius of the object-side surface of the fourth lens element is R7, and a curvature radius of the image-side surface of the fourth lens element is R8, the following relationship is satisfied: $-0.3<(R7-R8)/(R7+R8)<-0.05$. Therefore, the curvature of the surfaces of the fourth lens element can corrected the aberration generated from the optical image capturing lens assembly.

Furthermore, R7 and R8 can satisfy the following relationship: $-0.2<(R7-R8)/(R7+R8)<-0.1$.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following relationship is satisfied: $0.05<(T12+T45)/(T23+T34)<0.30$. Therefore, the fabrication of the lens elements can be easier due to the distance between of the lens elements.

When an axial distance between the object-side surface of the first lens element and the image plane is TTL, and a maximum image height of the optical image capturing lens assembly is ImgH, the following relationship is satisfied: $TTL/ImgH<1.8$. Therefore, the total track length of the optical image capturing lens assembly can be reduced so as to maintain the compact size of the optical image capturing lens assembly for portable electronic products.

When the focal length of the optical image capturing lens assembly is f, a central thickness of the second lens element is CT2, and the central thickness of the fourth lens element is CT4, the following relationship is satisfied: $0.03<(CT2+CT4)/f<0.15$. Therefore, the thickness of the second lens element and the fourth lens element can reduce the total track length of the optical image capturing lens assembly.

When a curvature radius of an object-side surface of the first lens element is R1, and a curvature radius of an image-side surface of the first lens element is R2, the following relationship is satisfied: $0<|R1/R2|<0.3$. Therefore, the spherical aberration of the optical image capturing lens assembly can be corrected, and the total track length thereof can be further reduced.

When an Abbe number of the first lens element is V1, and an Abbe number of the second lens element is V2, the following relationship is satisfied: $25<V1-V2<42$. Therefore, the chromatic aberration of the optical image capturing lens assembly can be corrected.

When the focal length of the optical image capturing lens assembly is f, and an entrance pupil diameter of the optical image capturing lens assembly is EPD, the following relationship is satisfied: $1.5<f/EPD<2.5$. Therefore, the optical image capturing lens assembly can obtain the characteristic of large stop for retaining high image quality under insufficient lighting condition, and can obtain shallow depth of field for projecting the photography subject.

Furthermore, f and EPD can satisfy the following relationship: $1.7<f/EPD<2.2$.

When the focal length of the second lens element is f2, and the focal length of the fourth lens element is f4, the following relationship is satisfied: $0.5<f2/f4<1.3$. Therefore, the refractive power of the second lens element and the fourth lens element can corrected the aberration generated from the optical image capturing lens assembly.

According to the optical image capturing lens assembly of the present disclosure, the lens elements thereof can be made of plastic material or glass. When the lens elements are made of glass material, the allocation of the refractive power of the optical image capturing lens assembly may be more flexible and easier to design. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, and the number of required lens elements can be reduced while constructing an optical system. Therefore, the total track length of the optical image capturing lens assembly can also be reduced.

According to the optical image capturing lens assembly of the present disclosure, when the lens element has a convex surface, it indicates that the paraxial region of the surface is convex; and when the lens element has a concave surface, it indicates that the paraxial region of the surface is concave.

According to the optical image capturing lens assembly of the present disclosure, the optical image capturing lens assembly can include at least one stop, such as a glare stop or a field stop, for reducing stray light while retaining high image quality. Furthermore, when the stop is an aperture stop, the position of the aperture stop within an optical system can be arbitrarily placed in front of the entire optical system, within the optical system, or in front of the image plane in accordance with the preference of the optical designer, in order to achieve the desirable optical features or higher image quality produced from the optical system.

According to the above description of the present disclosure, the following 1st-7th specific embodiments are provided for further explanation.

1st Embodiment

Figure 2:
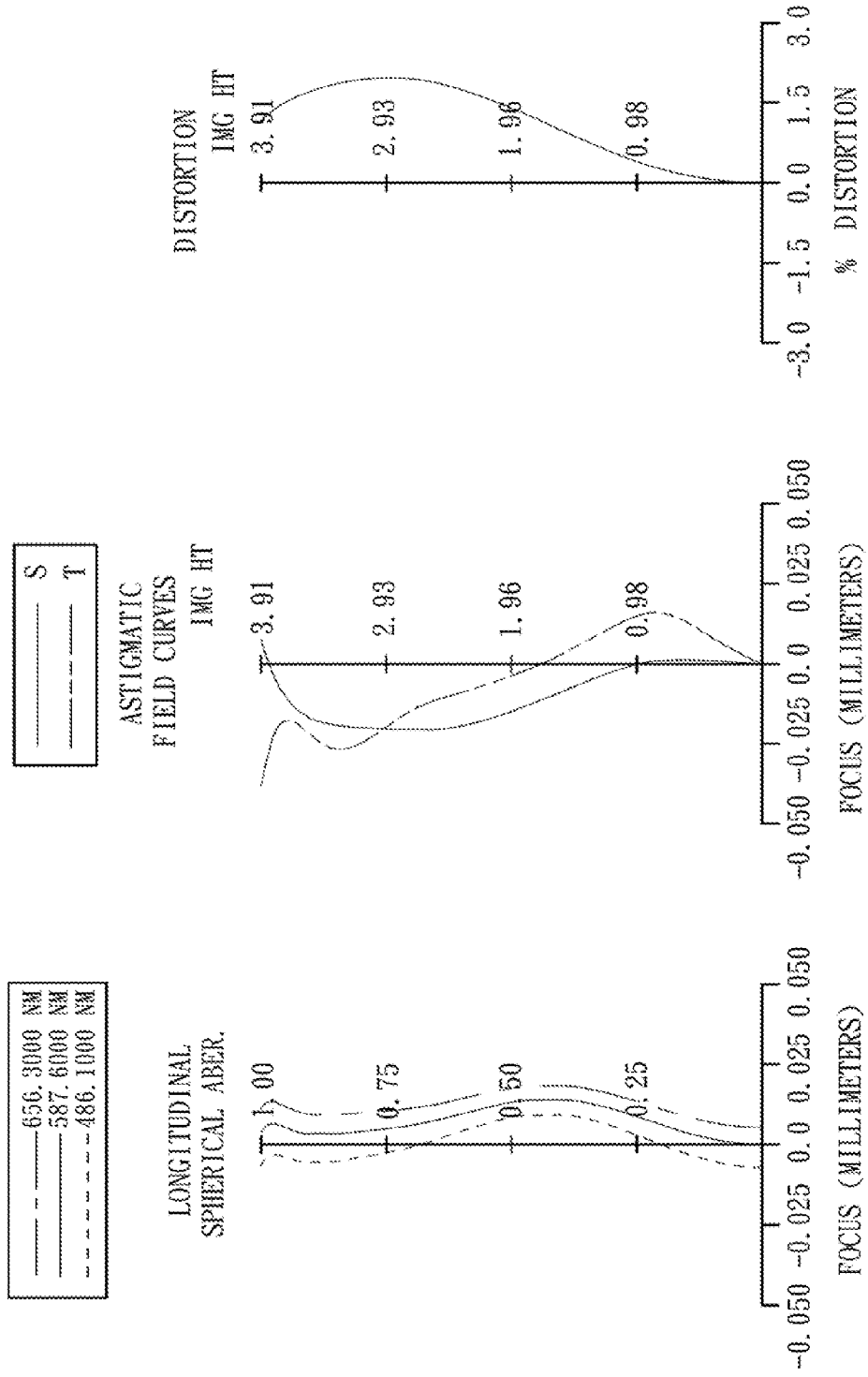
FIG. 2 shows spherical aberration curves, astigmatic field curves and a distortion curve of the optical image capturing lens assembly according to the 1st embodiment.

FIG. 1 is a schematic view of an optical image capturing lens assembly according to the 1st embodiment of the present disclosure. FIG. 2 shows spherical aberration curves, astigmatic field curves and a distortion curve of the optical image capturing lens assembly according to the 1st embodiment. In FIG. 1, the optical image capturing lens assembly includes, in order from an object side to an image side, an aperture stop 100, the first lens element 110, the second lens element 120, the third lens element 130, the fourth lens element 140, the fifth lens element 150, the sixth lens element 160, a stop 101, an IR-filter 180, an image plane 170 and an image sensor 190, wherein the aperture stop 100 is a front stop which located between an object and the first lens element 110.

The first lens element 110 with positive refractive power has a convex object-side surface 111 and a concave image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric.

The third lens element 130 with positive refractive power has a convex object-side surface 131 and a convex image-side surface 132, and is made of plastic material. The object-side surface 131 and the image-side surface 132 of the third lens element 130 are aspheric.

The fourth lens element 140 with negative refractive power has a concave object-side surface 141 and a convex image-side surface 142, and is made of plastic material. The object-side surface 141 and the image-side surface 142 of the fourth lens element 140 are aspheric.

The fifth lens element 150 with positive refractive power has a convex object-side surface 151 and a convex image-side surface 152, and is made of plastic material. The object-side surface 151 and the image-side surface 152 of the fifth lens element 150 are aspheric.

The sixth lens element 160 with negative refractive power has a concave object-side surface 161 and a concave image-side surface 162, and is made of plastic material. The object-side surface 161 and the image-side surface 162 of the sixth lens element 160 are aspheric. Furthermore, the sixth lens element 160 has inflection points formed on the object-side surface 161 and the image-side surface 162 thereof.

The IR-filter 180 is located between the stop 101 and the image plane 170, and will not affect the focal length of the optical image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius of the lens elements;

k is the conic coefficient; and

Ai is the i-th aspheric coefficient.

In the optical image capturing lens assembly according to the 1st embodiment, when a focal length of the optical image capturing lens assembly is f, an f-number of the optical image capturing lens assembly is Fno, and half of the maximal field of view is HFOV, these parameters have the following values:

f=5.04 mm;

Fno=2.08; and

HFOV=37.5 degrees.

In the optical image capturing lens assembly according to the 1st embodiment, when an Abbe number of the first lens element 110 is V1, and an Abbe number of the second lens element 120 is V2, the following relationship is satisfied:

$V1-V2=32.6$.

In the optical image capturing lens assembly according to the 1st embodiment, when a focal length of the optical image capturing lens assembly is f, a central thickness of the second lens element 120 is CT2, and the central thickness of the fourth lens element 140 is CT4, the following relationship is satisfied:

$(CT2+CT4)/f=0.10$.

In the optical image capturing lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, and an axial distance between the fourth lens element 140 and the fifth lens element 150 is T45, the following relationship is satisfied:

$(T12+T45)/(T23+T34)=0.15$.

In the optical image capturing lens assembly according to the 1st embodiment, when a curvature radius of an object-side surface 111 of the first lens element 110 is R1, a curvature radius of an image-side surface 112 of the first lens element 110 is R2, a curvature radius of the object-side surface 141 of the fourth lens element 140 is R7, a curvature radius of the image-side surface 142 of the fourth lens element 140 is R8, the following relationships are satisfied:

$|R1/R2|0.08$; and $(R7-R8)/(R7+R8)=-0.16$.

In the optical image capturing lens assembly according to the 1st embodiment, when the focal length of the optical image capturing lens assembly is f, a focal length of the second lens element 120 is f2, a focal length of the fourth lens element 140 is f4, a focal length of the fifth lens element 150 is f5, and a focal length of the sixth lens element 160 is f6, the following relationships are satisfied:

$f2/f4=1.15$; and $|f/f5|+|f/f6|=4.22$.

Figure 15:
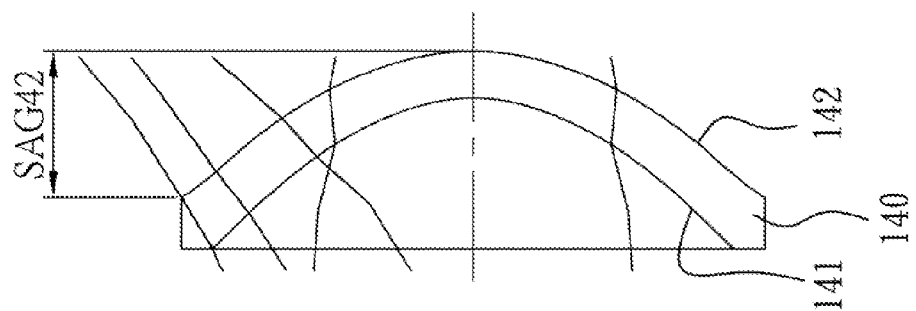
FIG. 15 shows the fourth lens element of the optical image capturing lenses according to the 1st embodiment of the present disclosure.

FIG. 15 shows the fourth lens element 140 of the optical image capturing lenses according to the 1 st embodiment of the present disclosure. When a distance in parallel with an optical axis from a maximum effective diameter position to an axial vertex on the image-side surface 142 of the fourth lens element 140 is SAG42, and a central thickness of the fourth lens element is CT4, the following relationship is satisfied:

$SAG42/CT4=-3.09$.

FIG. 16 shows the sixth lens element 160 of the optical image capturing is lenses according to the 1st embodiment of the present disclosure. When a distance perpendicular to the optical axis between a non-axial critical point on the image-side surface 162 of the sixth lens element 160 and the optical axis is Yc, and a distance perpendicular to the optical axis between the maximum effective diameter position and the optical axis is Yd, the following relationship is satisfied:

$Yc/Yd=0.59$.

In the optical image capturing lens assembly according to the 1st embodiment, when the focal length of the optical image capturing lens assembly is f, and an entrance pupil diameter of the optical image capturing lens assembly is EPD, the following relationship is satisfied:

$f/EPD=2.08$.

In the optical image capturing lens assembly according to the 1st embodiment, when an axial distance between the object-side surface 111 of the first lens element 110 and the image plane 170 is TTL, and a maximum image height of the optical image capturing lens assembly is ImgH which here is a half of the diagonal length of the photosensitive area of the image sensor 190 on the image plane 170, the following relationship is satisfied:

$TTL/ImgH = 1.64$.

The detailed optical data of the 1st embodiment are shown in Table 1 and the aspheric surface data are shown in Table 2 below.

related to Table 1 and Table 2 applies also to the Tables for the remaining embodiments, and so an explanation in this regard will not be provided again.

2nd Embodiment

Figure 3:
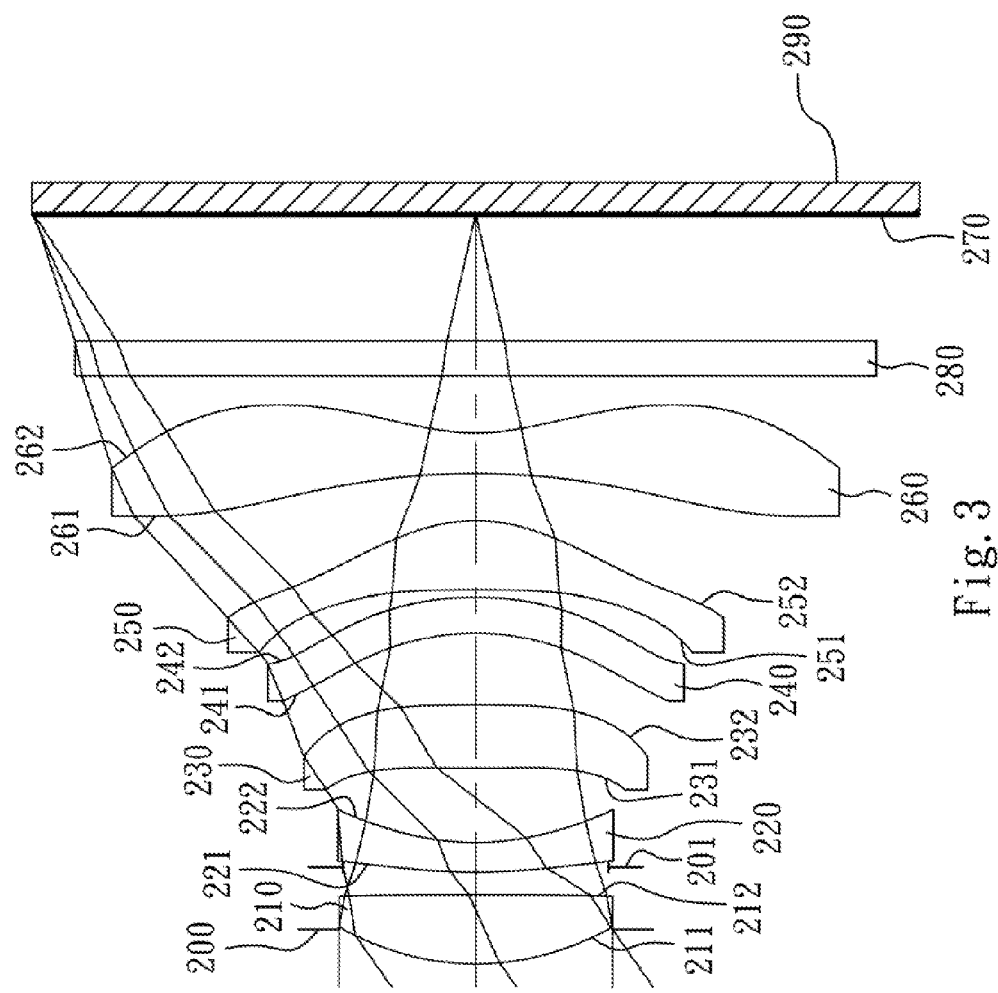
FIG. 3 is a schematic view of an optical image capturing lens assembly according to the 2nd embodiment of the present disclosure.
Figure 4:
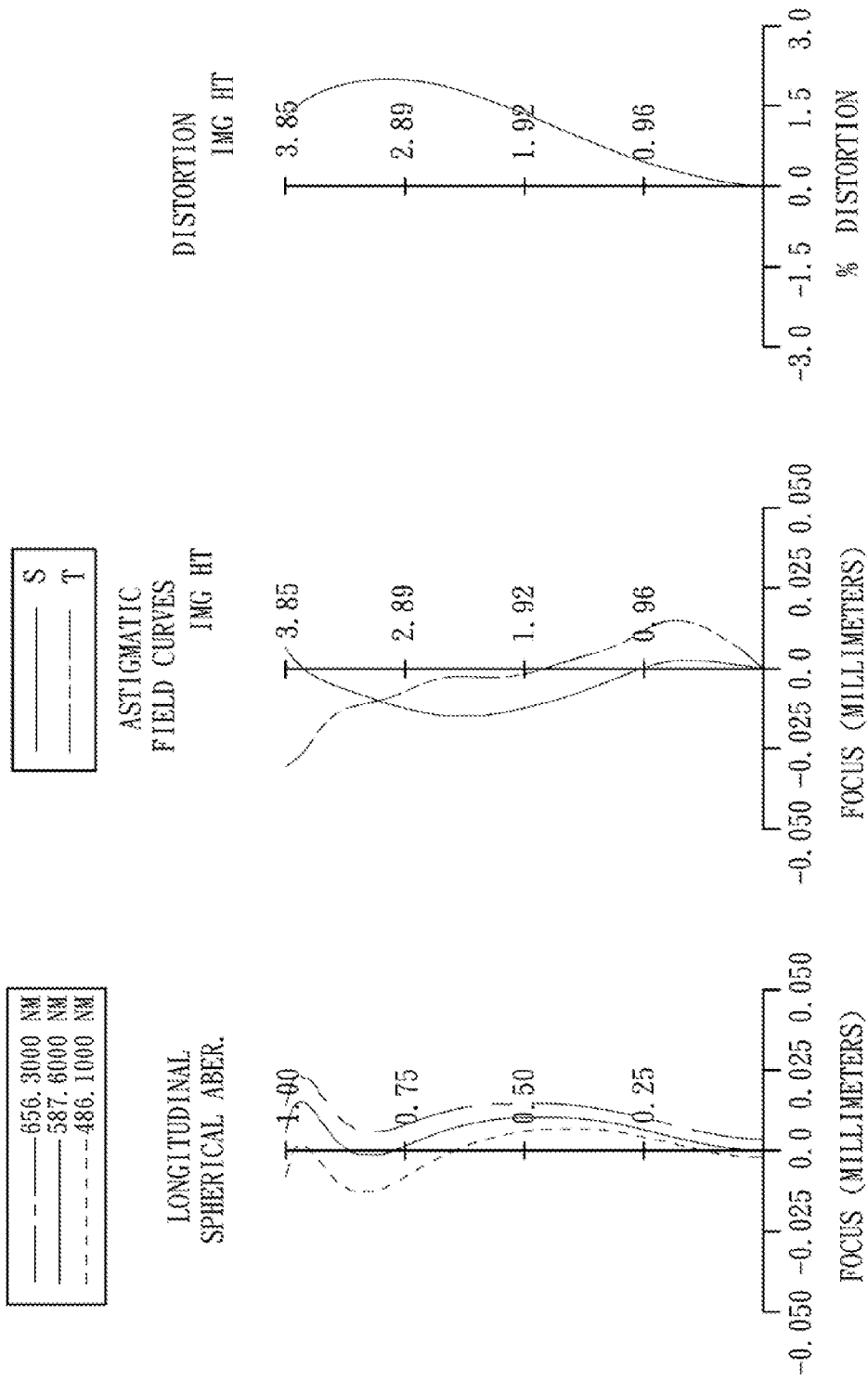
FIG. 4 shows spherical aberration curves, astigmatic field curves and a distortion curve of the optical image capturing lens assembly according to the 2nd embodiment.

FIG. 3 is a schematic view of an optical image capturing lens assembly according to the 2nd embodiment of the present disclosure. FIG. 4 shows spherical aberration curves, astigmatic field curves and a distortion curve of the optical image capturing lens assembly according to the 2nd embodiment. In FIG. 3, the optical image capturing lens assembly includes, in order from an object side to an image side, an

TABLE 1

1st Embodiment
f = 5.04 mm, Fno = 2.08, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.300 | | | | |
| 2 | Lens 1 | 2.273520 (ASP) | 0.793 | Plastic | 1.544 | 55.9 | 4.51 |
| 3 | | 26.975700 (ASP) | 0.107 | | | | |
| 4 | Lens 2 | 6.187900 (ASP) | 0.250 | Plastic | 1.640 | 23.3 | −8.80 |
| 5 | | 2.900840 (ASP) | 0.471 | | | | |
| 6 | Lens 3 | 36.998700 (ASP) | 0.727 | Plastic | 1.544 | 55.9 | 12.37 |
| 7 | | −8.173300 (ASP) | 0.565 | | | | |
| 8 | Lens 4 | −0.993390 (ASP) | 0.267 | Plastic | 1.640 | 23.3 | −7.65 |
| 9 | | −1.377070 (ASP) | 0.050 | | | | |
| 10 | Lens 5 | 6.107200 (ASP) | 0.750 | Plastic | 1.544 | 55.9 | 2.31 |
| 11 | | −1.513930 (ASP) | 0.265 | | | | |
| 12 | Lens 6 | −9.153500 (ASP) | 0.449 | Plastic | 1.544 | 55.9 | −2.47 |
| 13 | | 1.600860 (ASP) | 0.000 | | | | |
| 14 | Stop | Plano | 0.700 | | | | |
| 15 | IR-filter | Plano | 0.300 | Glass | 1.517 | 64.2 | — |
| 16 | | Plano | 0.818 | | | | |
| 17 | Image | Plano | — | | | | |

Note:
Reference wavelength (d-line) is 587.6 nm.
Effective radius of Surface 14 is 3.20 mm.

TABLE 2

Aspheric Coefficients

| Surface # | 2 | 3 | 4 | 5 | 6 | 7 |
|---|---|---|---|---|---|---|
| k = | 1.63180E−01 | −1.00000E+00 | −4.92878E+01 | −1.18170E+01 | −1.00000E+00 | −1.00000E+00 |
| A4 = | −9.23740E−04 | −4.70902E−02 | −9.20451E−02 | −3.68393E−02 | −6.13928E−02 | −3.84187E−02 |
| A6 = | −7.10043E−03 | 4.98349E−02 | 1.36569E−01 | 8.61941E−02 | 1.57614E−03 | −1.23875E−02 |
| A8 = | 1.23156E−02 | −1.61791E−02 | −7.89929E−02 | −5.33325E−02 | −1.20789E−02 | −1.19347E−03 |
| A10 = | −1.55706E−02 | −2.93442E−02 | −2.55422E−03 | 9.85458E−03 | 9.16038E−03 | 1.41105E−03 |
| A12 = | 8.50790E−03 | 2.34270E−02 | 1.90111E−02 | 3.73897E−03 | −4.79202E−03 | 1.09611E−04 |
| A14 = | −2.27208E−03 | −5.46318E−03 | −4.96023E−03 | −1.01823E−03 | −1.24296E−04 | −2.69876E−04 |

| Surface # | 8 | 9 | 10 | 11 | 12 | 13 |
|---|---|---|---|---|---|---|
| k = | −1.69040E+00 | −6.33449E−01 | −5.00000E+01 | −6.14059E+00 | −1.17440E+01 | −8.74572E+00 |
| A4 = | 1.17830E−01 | 8.50613E−02 | −8.66474E−02 | −3.72231E−02 | −2.78714E−02 | −2.87160E−02 |
| A6 = | −1.82575E−01 | −5.65013E−02 | 4.18113E−02 | 5.03440E−03 | 7.74407E−03 | 5.73404E−03 |
| A8 = | 1.27286E−01 | 3.41485E−02 | −1.39313E−02 | 6.94401E−03 | −7.71374E−04 | −9.00821E−04 |
| A10 = | −5.81879E−02 | −1.47911E−02 | 1.98771E−03 | −3.36735E−03 | 7.21453E−06 | 8.28672E−05 |
| A12 = | 1.67284E−02 | 3.88805E−03 | −1.41318E−04 | 5.86587E−04 | 4.17697E−06 | −4.05130E−06 |
| A14 = | −2.07980E−03 | −3.57253E−04 | 4.68519E−06 | −3.75902E−05 | −2.26577E−07 | 8.11580E−08 |

In Table 1, the curvature radius, the thickness and the focal length are shown in millimeters (mm). Surface numbers 0-17 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information aperture stop 200, the first lens element 210, a stop 201, the second lens element 220, the third lens element 230, the fourth lens element 240, the fifth lens element 250, the sixth lens element 260, an IR-filter 280, an image plane 270 and an image sensor 290, wherein the aperture stop 200 is a front stop which located between an object and the first lens element 210.

The first lens element 210 with positive refractive power has a convex object-side surface 211 and a convex image-side surface 212, and is made of plastic material. The object-side surface 211 and the image-side surface 212 of the first lens element 210 are aspheric.

The second lens element 220 with negative refractive power has a convex object-side surface 221 and a concave image-side surface 222, and is made of plastic material. The object-side surface 221 and the image-side surface 222 of the second lens element 220 are aspheric.

The third lens element 230 with positive refractive power has a convex object-side surface 231 and a convex image-side surface 232, and is made of plastic material. The object-side surface 231 and the image-side surface 232 of the third lens element 230 are aspheric.

The fourth lens element 240 with negative refractive power has a concave object-side surface 241 and a convex image-side surface 242, and is made of plastic material. The object-side surface 241 and the image-side surface 242 of the fourth lens element 240 are aspheric.

The fifth lens element 250 with positive refractive power has a concave object-side surface 251 and a convex image-side surface 252, and is made of plastic material. The object-side surface 251 and the image-side surface 252 of the fifth lens element 250 are aspheric.

The sixth lens element 260 with negative refractive power has a concave object-side surface 261 and a concave image-side surface 262, and is made of plastic material. The object-side surface 261 and the image-side surface 262 to of the sixth lens element 260 are aspheric. Furthermore, the sixth lens element 260 has inflection points formed on the object-side surface 261 and the image-side surface 262 thereof.

The IR-filter 280 is made of glass material, wherein the IR-filter 280 is located between the sixth lens element 260 and the image plane 270, and will not affect the focal length of the optical image capturing lens assembly.

The detailed optical data of the 2nd embodiment are shown in Table 3 and the aspheric surface data are shown in Table 4 below.

TABLE 3

2nd Embodiment
f = 5.38 mm, Fno = 2.27, HFOV = 35.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.300 | | | | |
| 2 | Lens 1 | 2.331700 (ASP) | 0.599 | Plastic | 1.544 | 55.9 | 4.20 |
| 3 | | −100.000000 (ASP) | 0.247 | | | | |
| 4 | Stop | Plano | −0.046 | | | | |
| 5 | Lens 2 | 4.363500 (ASP) | 0.257 | Plastic | 1.640 | 23.3 | −6.87 |
| 6 | | 2.139970 (ASP) | 0.644 | | | | |
| 7 | Lens 3 | 32.232100 (ASP) | 0.551 | Plastic | 1.544 | 55.9 | 17.31 |
| 8 | | −13.231600 (ASP) | 0.625 | | | | |
| 9 | Lens 4 | −1.990290 (ASP) | 0.310 | Plastic | 1.640 | 23.3 | −11.34 |
| 10 | | −2.909740 (ASP) | 0.061 | | | | |
| 11 | Lens 5 | −100.000000 (ASP) | 0.604 | Plastic | 1.544 | 55.9 | 2.47 |
| 12 | | −1.329000 (ASP) | 0.406 | | | | |
| 13 | Lens 6 | −6.413900 (ASP) | 0.353 | Plastic | 1.544 | 55.9 | −2.55 |
| 14 | | 1.802700 (ASP) | 0.500 | | | | |
| 15 | IR-filter | Plano | 0.300 | Glass | 1.517 | 64.2 | — |
| 16 | | Plano | 1.103 | | | | |
| 17 | Image | Plano | — | | | | |

Note:
Reference wavelength (d-line) is 587.6 nm.
Effective radius of Surface 4 is 1.15 mm.

TABLE 4

Aspheric Coefficients

| Surface # | 2 | 3 | 5 | 6 | 7 | 8 |
|---|---|---|---|---|---|---|
| k = | 5.87185E−01 | −1.00000E+00 | −9.02493E+00 | −2.67138E+00 | −1.00000E+00 | −1.00000E+00 |
| A4 = | −6.04665E−03 | −8.39945E−03 | −7.57332E−02 | −6.78386E−02 | −5.63955E−02 | −4.65608E−02 |
| A6 = | 1.15411E−03 | 2.18980E−02 | 9.01139E−02 | 9.00391E−02 | −4.61324E−03 | −1.14612E−02 |
| A8 = | −5.02620E−03 | −1.78245E−02 | −4.87464E−02 | −4.87900E−02 | −3.71956E−03 | 9.84430E−04 |
| A10 = | 2.30444E−03 | 2.56449E−03 | −6.56750E−05 | 6.72578E−03 | 2.27756E−03 | −1.50061E−03 |
| A12 = | 5.53011E−04 | 2.43260E−03 | 9.51173E−03 | 5.00932E−03 | −1.15273E−03 | 1.50557E−03 |
| A14 = | −1.09054E−03 | −1.54819E−03 | −2.50178E−03 | −1.52297E−03 | −1.99208E−04 | −5.10483E−04 |

| Surface # | 9 | 10 | 11 | 12 | 13 | 14 |
|---|---|---|---|---|---|---|
| k = | −6.54001E−01 | 6.83621E−01 | −8.39270E+00 | −4.27775E+00 | −8.48439E+01 | −9.18727E+00 |
| A4 = | 3.19951E−02 | −4.33871E−02 | −1.06806E−01 | −3.82481E−02 | −2.18430E−02 | −3.22683E−02 |
| A6 = | −2.86763E−02 | 3.32946E−02 | 5.77943E−02 | 1.35860E−02 | 4.97113E−03 | 6.47969E−03 |
| A8 = | 9.79246E−03 | −1.70888E−02 | −1.74618E−02 | 5.72007E−03 | −3.85486E−04 | −1.03139E−03 |
| A10 = | 1.44813E−03 | 5.69948E−03 | 1.52686E−03 | −3.58090E−03 | 5.61579E−06 | 9.63645E−05 |
| A12 = | −6.50917E−04 | −6.16016E−04 | 2.81114E−04 | 6.59095E−04 | 6.26694E−07 | −4.85608E−06 |
| A14 = | | | −5.96364E−05 | −4.44476E−05 | −1.96345E−08 | 1.06138E−07 |

In the optical image capturing lens assembly according to the 2nd embodiment, the definitions of f, Fno, HFOV, V1, V2, CT2, CT4, T12, T23, T34, T45, R1, R2, R7, R8, f2, f4, f5, f6, SAG42, Yc, Yd, EPD, TTL and ImgH are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 5.38 | (R7 − R8)/(R7 + R8) | −0.19 |
| Fno | 2.27 | f2/f4 | 0.61 |
| HFOV (deg.) | 35.2 | \|f/f5\| + \|f/f6\| | 4.29 |
| V1 − V2 | 32.6 | SAG42/CT4 | −1.88 |
| (CT2 + CT4)/f | 0.11 | Yc/Yd | 0.54 |
| (T12 + T45)/(T23 + T34) | 0.21 | f/EPD | 2.27 |
| \|R1/R2\| | 0.02 | TTL/ImgH | 1.67 |

3rd Embodiment

Figure 5:
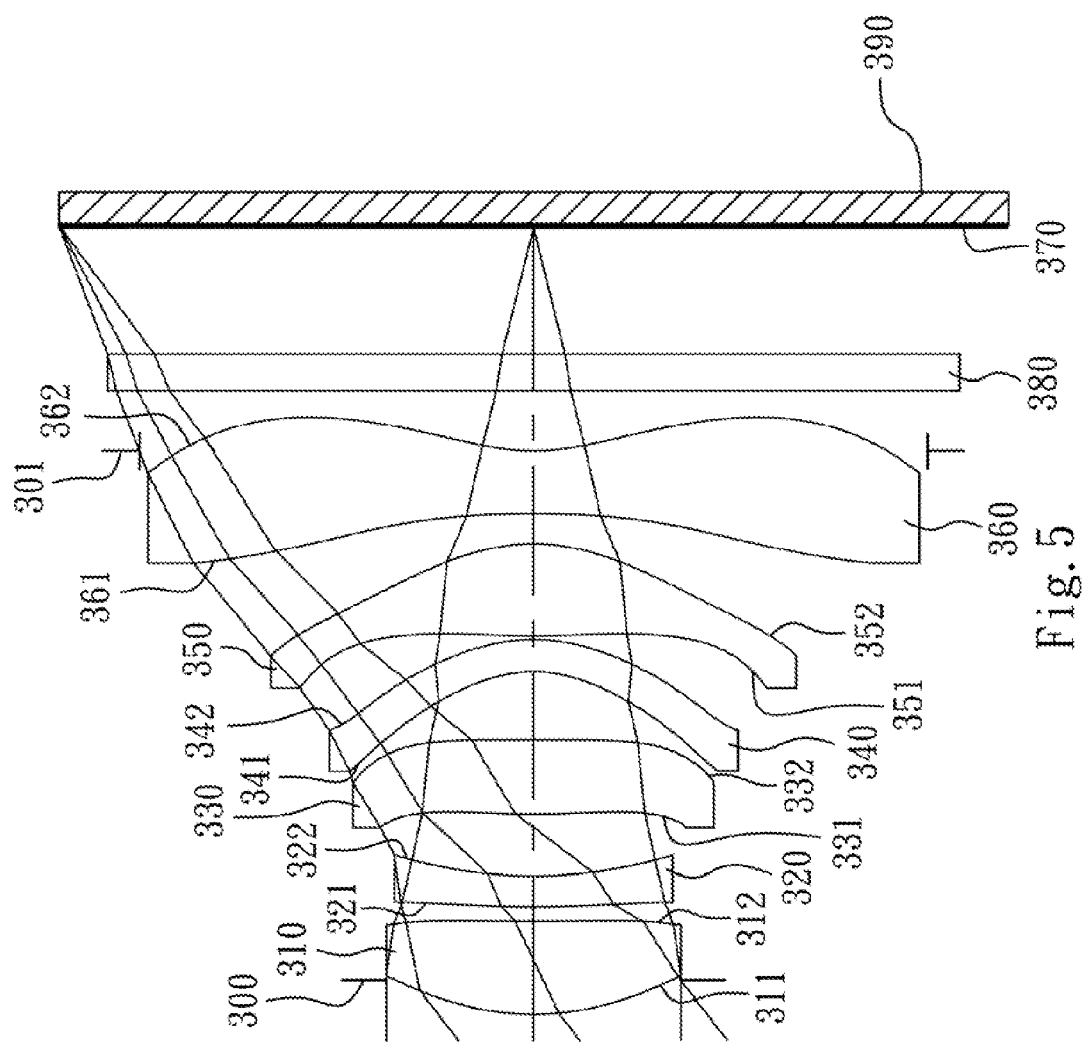
FIG. 5 is a schematic view of an optical image capturing lens assembly according to the 3rd embodiment of the present disclosure.
Figure 6:
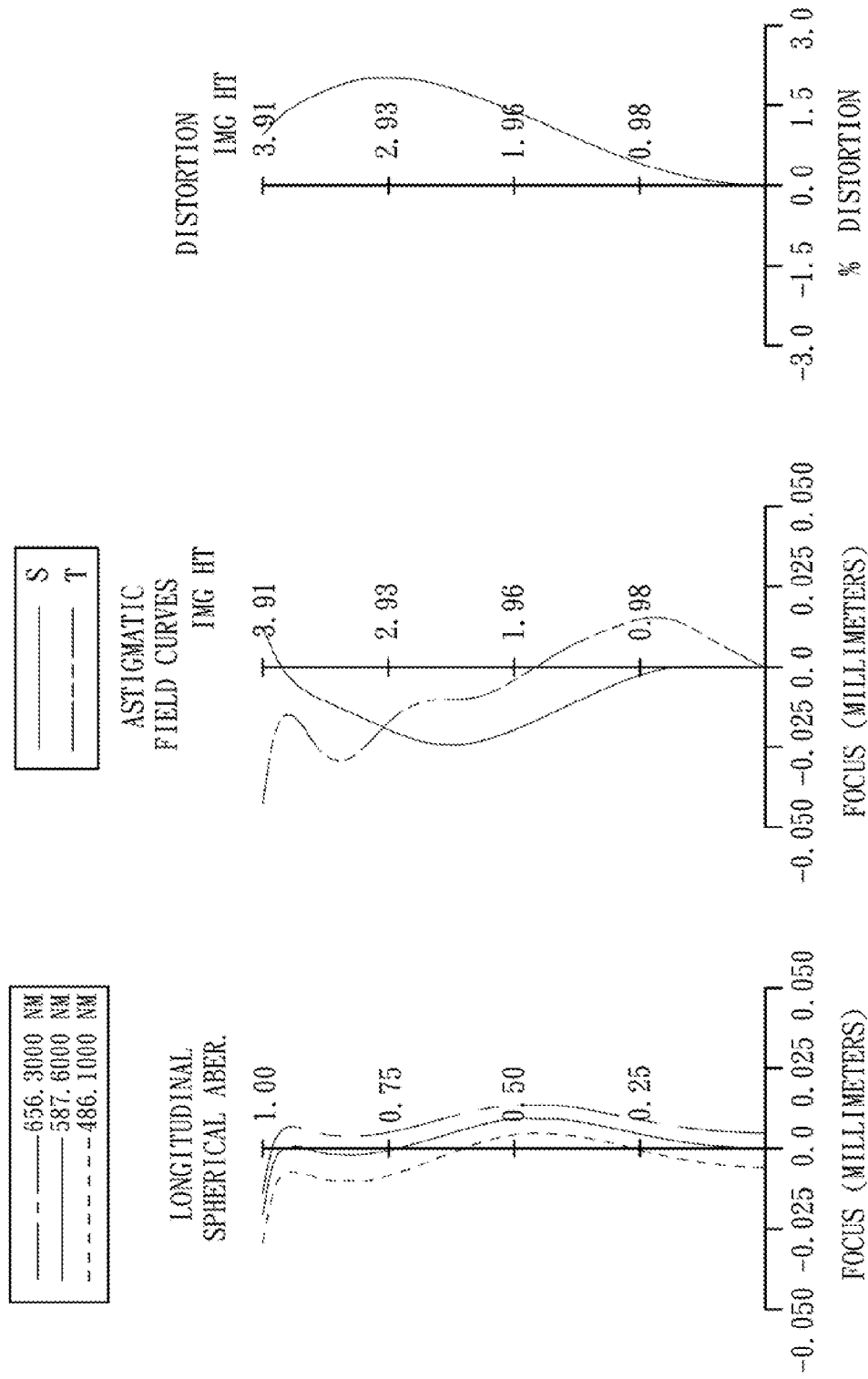
FIG. 6 shows spherical aberration curves, astigmatic field curves and a distortion curve of the optical image capturing lens assembly according to the 3rd embodiment.

FIG. 5 is a schematic view of an optical image capturing lens assembly according to the 3rd embodiment of the present disclosure. FIG. 6 shows spherical aberration curves, astigmatic field curves and a distortion curve of the optical image capturing lens assembly according to the 3rd embodiment. In FIG. 5, the optical image capturing lens assembly includes, in order from an object side to an image side, an aperture stop 300, the first lens element 310, the second lens element 320, the third lens element 330, the fourth lens element 340, the fifth lens element 350, the sixth lens element 360, a stop 301, an IR-filter 380, an image plane 370 and an image sensor 390, wherein the aperture stop 300 is a front stop which located between an object and the first lens element 310.

The first lens element 310 with positive refractive power has a convex object-side surface 311 and a concave image-side surface 312, and is made of plastic material. The object-side surface 311 and the age-side surface 312 of the first lens element 310 are aspheric.

The second lens element 320 with negative refractive power has a convex object-side surface 321 and a concave image-side surface 322, and is made of plastic material. The object-side surface 321 and the image-side surface 322 of the second lens element 320 are aspheric.

The third lens element 330 with positive refractive power has a convex object-side surface 331 and a concave image-side surface 332, and is made of plastic material. The object-side surface 331 and the image-side surface 332 of the third lens element 330 are aspheric.

The fourth lens element 340 with negative refractive power has a concave object-side surface 341 and a convex image-side surface 342, and is made of plastic material. The object-side surface 341 and the image-side surface 342 of the fourth lens element 340 are aspheric.

The fifth lens element 350 with positive refractive power has a convex object-side surface 351 and a convex image-side surface 352, and is made of plastic material. The object-side surface 351 and the image-side surface 352 of the fifth lens element 350 are aspheric.

The sixth lens element 360 with negative refractive power has a concave object-side surface 361 and a concave image-side surface 362, and is made of plastic material. The object-side surface 361 and the image-side surface 362 of the sixth lens element 360 are aspheric. Furthermore, the sixth lens element 360 has inflection points formed on the object-side surface 361 and the image-side surface 362 thereof.

The IR-filter 380 is made of glass material, wherein the IR-filter 380 is located between the stop 301 and the image plane 370, and will not affect the focal length of the optical image capturing lens assembly.

The detailed optical data of the 3rd embodiment are shown in Table 5 and the aspheric surface data are shown in Table 6 below.

TABLE 5

3rd Embodiment
f = 5.05 mm, Fno = 2.08, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.280 | | | | |
| 2 | Lens 1 | 2.325010 (ASP) | 0.767 | Plastic | 1.544 | 55.9 | 4.68 |
| 3 | | 23.728200 (ASP) | 0.123 | | | | |
| 4 | Lens 2 | 6.951700 (ASP) | 0.250 | Plastic | 1.640 | 23.3 | −9.17 |
| 5 | | 3.137500 (ASP) | 0.512 | | | | |
| 6 | Lens 3 | 7.586400 (ASP) | 0.611 | Plastic | 1.544 | 55.9 | 15.05 |
| 7 | | 100.000000 (ASP) | 0.565 | | | | |
| 8 | Lens 4 | −1.041690 (ASP) | 0.268 | Plastic | 1.640 | 23.3 | −7.28 |
| 9 | | −1.476460 (ASP) | 0.030 | | | | |
| 10 | Lens 5 | 6.398400 (ASP) | 0.759 | Plastic | 1.544 | 55.9 | 2.25 |
| 11 | | −1.452640 (ASP) | 0.250 | | | | |
| 12 | Lens 6 | −9.055600 (ASP) | 0.513 | Plastic | 1.544 | 55.9 | −2.58 |
| 13 | | 1.691690 (ASP) | 0.000 | | | | |
| 14 | Stop | Plano | 0.500 | | | | |
| 15 | IR-fifter | Plano | 0.300 | Glass | 1.517 | 64.2 | — |
| 16 | | Plano | 1.064 | | | | |
| 17 | Image | Plano | — | | | | |

Note:
Reference wavelength (d-line) is 587.6 nm.
Effective radius of Surface 14 is 3.25 mm.

TABLE 6

Aspheric Coefficients

| Surface # | 2 | 3 | 4 | 5 | 6 | 7 |
|---|---|---|---|---|---|---|
| k = | 9.91516E−02 | −1.00000E+00 | −5.00000E+01 | −1.54818E+01 | −1.00000E+00 | −1.00000E+00 |
| A4 = | −1.94215E−03 | −4.41412E−02 | −8.92780E−02 | −3.36770E−02 | −6.69342E−02 | −4.01672E−02 |
| A6 = | −7.90066E−03 | 4.49382E−02 | 1.35872E−01 | 8.32478E−02 | 4.94070E−03 | −1.02012E−02 |
| A8 = | 1.26903E−02 | −1.72663E−02 | −8.09737E−02 | −5.39309E−02 | −1.39674E−02 | −2.96100E−03 |
| A10 = | −1.63613E−02 | −2.88400E−02 | −3.24697E−03 | 9.87060E−03 | 9.05594E−03 | 1.33434E−03 |
| A12 = | 8.74402E−03 | 2.37907E−02 | 1.95151E−02 | 3.40213E−03 | −4.10549E−03 | 2.30598E−04 |
| A14 = | −2.36823E−03 | −5.61726E−03 | −4.86146E−03 | −9.50576E−04 | −6.83604E−05 | −3.11975E−04 |

| Surface # | 8 | 9 | 10 | 11 | 12 | 13 |
|---|---|---|---|---|---|---|
| k = | −1.68050E+00 | −6.26322E−01 | −5.05000E+01 | −5.40427E+00 | −3.34242E+01 | −9.27518E+00 |
| A4 = | 1.29346E−01 | 8.24391E−02 | −8.44297E−02 | −3.73999E−02 | −2.66555E−02 | −2.74586E−02 |
| A6 = | −1.79462E−01 | −5.64475E−02 | 4.27998E−02 | 6.57574E−03 | 7.65126E−03 | 5.46833E−03 |
| A8 = | 1.26985E−01 | 3.43805E−02 | −1.43258E−02 | 6.87087E−03 | −7.87934E−04 | −8.65524E−04 |
| A10 = | −5.85514E−02 | −1.47830E−02 | 1.97497E−03 | −3.38913E−03 | 6.61812E−06 | 8.07384E−05 |
| A12 = | 1.66344E−02 | 3.88022E−03 | −1.22028E−04 | 5.86882E−04 | 4.38794E−06 | −4.15082E−06 |
| A14 = | −2.07896E−03 | −3.68358E−04 | 7.75720E−07 | −3.81886E−05 | −2.27328E−07 | 9.25775E−08 |

In the optical image capturing lens assembly according to the 3rd embodiment, the definitions of f, Fno, HFOV, V1, V2, CT2, CT4, T12, T23, T34, T45, R1, R2, R7, R8, f2, f4, f5, f6, SAG42, Yc, Yd, EPD, TTL and ImgH are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 5.05 | (R7 − R8)/(R7 + R8) | −0.17 |
| Fno | 2.08 | f2/f4 | 1.26 |
| HFOV (deg.) | 37.5 | \|f/f5\| + \|f/f6\| | 4.20 |
| V1 − V2 | 32.6 | SAG42/CT4 | −2.82 |
| (CT2 + CT4)/f | 0.10 | Yc/Yd | 0.58 |
| (T12 + T45)/(T23 + T34) | 0.14 | f/EPD | 2.08 |
| \|R1/R2\| | 0.10 | TTL/ImgH | 1.64 |

4th Embodiment

Figure 7:
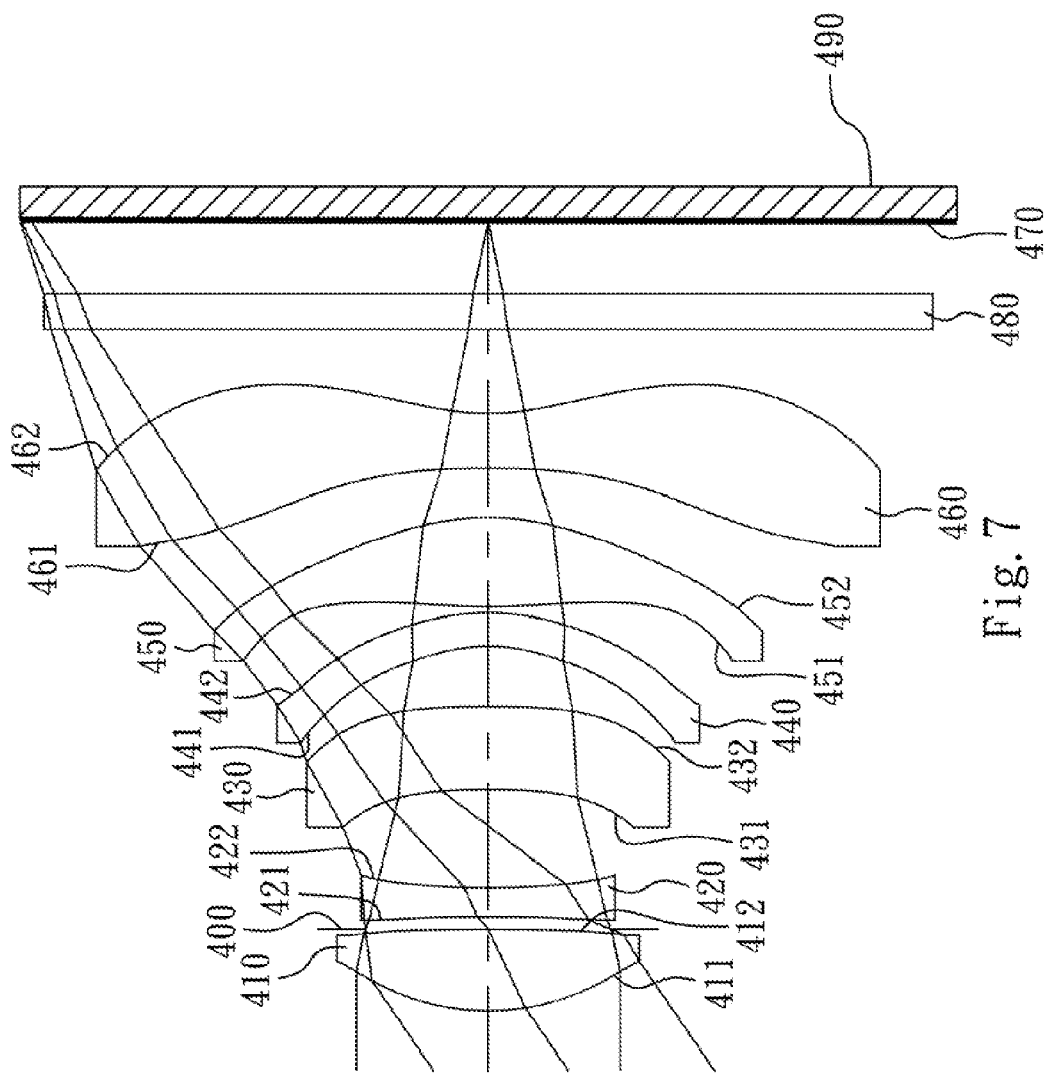
FIG. 7 is a schematic view of an optical image capturing lens assembly according to the 4th embodiment of the present disclosure.
Figure 8:
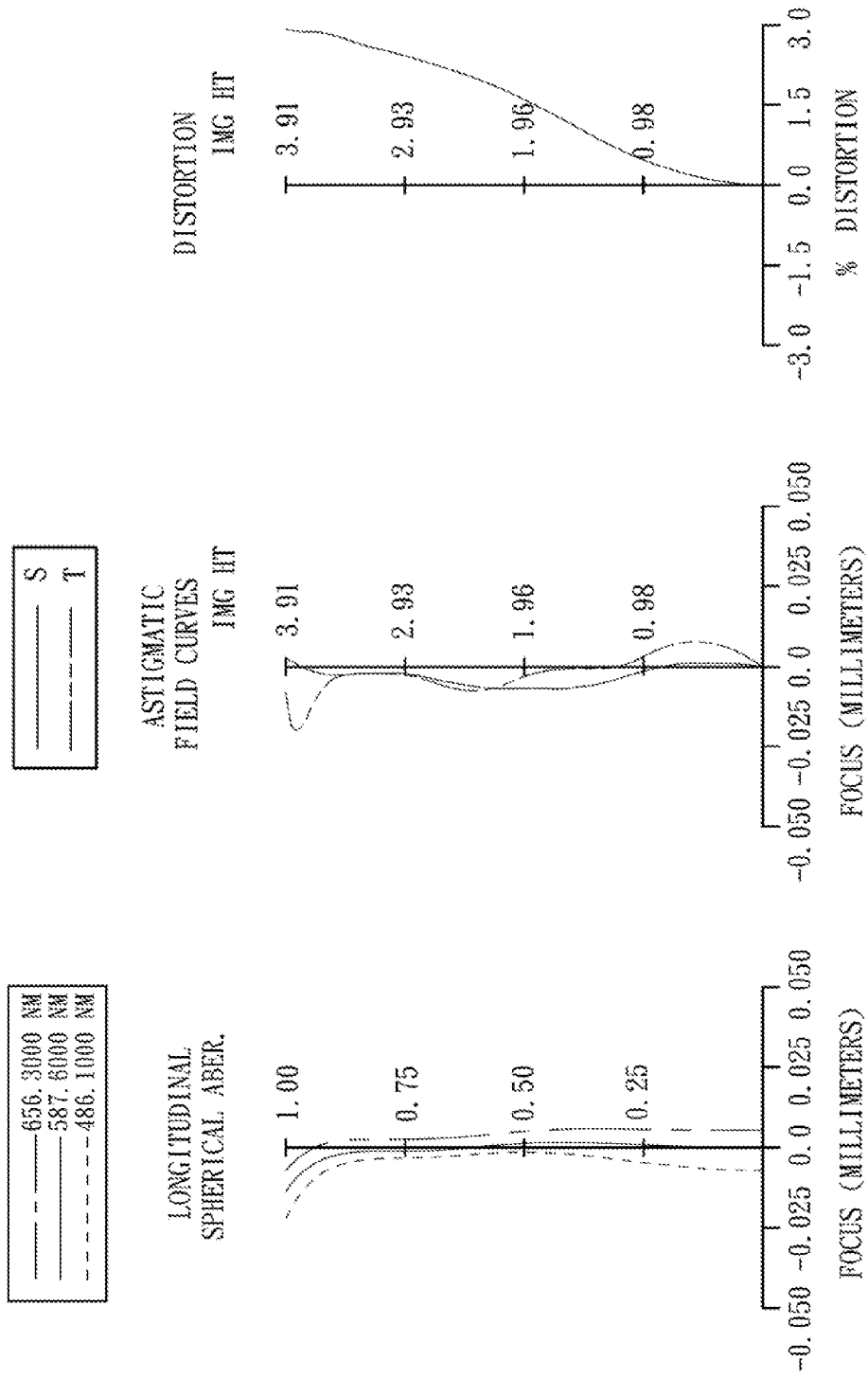
FIG. 8 shows spherical aberration curves, astigmatic field curves and a distortion curve of the optical image capturing lens assembly according to the 4th embodiment.

FIG. 7 is a schematic view of an optical image capturing lens assembly according to the 4th embodiment of the present disclosure. FIG. 8 shows spherical aberration curves, astigmatic field curves and a distortion curve of the optical image capturing lens assembly according to the 4th embodiment. In FIG. 7, the optical image capturing lens assembly includes, in order from an object side to an image side, the first lens element 410, an aperture stop 400, the second lens element 420, the third lens element 430, the fourth lens element 440, the fifth lens element 450, the sixth lens element 460, an IR-filter 480, an image plane 470 and an image sensor 490.

The first lens element 410 with positive refractive power has a convex object-side surface 411 and a convex image-side surface 412, and is made of plastic material. The object-side surface 411 and the image-side surface 412 of the first lens element 410 are aspheric.

The second lens element 420 with negative refractive power has a concave object-side surface 421 and a concave image-side surface 422, and is made of plastic material. The object-side surface 421 and the image-side surface 422 of the second lens element 420 are aspheric.

The third lens element 430 with negative refractive power has a concave object-side surface 431 and a convex image-side surface 432, and is made of plastic material. The object-side surface 431 and the image-side surface 432 of the third lens element 430 are aspheric.

The fourth lens element 440 with negative refractive power has a concave object-side surface 441 and a convex image-side surface 442, and is made of plastic material. The object-side surface 441 and the image-side surface 442 of the fourth lens element 440 are aspheric.

The fifth lens element 450 with positive refractive power has a convex object-side surface 451 and a convex image-side surface 452, and is made of plastic material. The object-side surface 451 and the image-side surface 452 of the fifth lens element 450 are aspheric.

The sixth lens element 460 with negative refractive power has a concave object-side surface 461 and a concave image-side surface 462, and is made of plastic material. The object-side surface 461 and the image-side surface 462 of the sixth lens element 460 are aspheric. Furthermore, the sixth lens element 460 has inflection points formed on the object-side surface 461 and the image-side surface 462 thereof.

The IR-filter 480 is made of glass material, wherein the IR-filter 480 is located between the sixth lens element 460 and the image plane 470, and will not affect the focal length of the optical image capturing lens assembly.

The detailed optical data of the 4th embodiment are shown in Table 7 and the aspheric surface data are shown in Table 8 below.

TABLE 7

4th Embodiment
f = 5.52 mm, Fno = 2.50, HFOV = 34.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.011470 (ASP) | 0.681 | Plastic | 1.535 | 56.3 | 3.65 |
| 2 | | −60.176900 (ASP) | 0.002 | | | | |
| 3 | Ape. Stop | Plano | 0.102 | | | | |

TABLE 7-continued

4th Embodiment
f = 5.52 mm, Fno = 2.50, HFOV = 34.5 deg.

| Surface # | | Curvature Radius | Thickness | Material | Index | Abbe # | Focal length |
|---|---|---|---|---|---|---|---|
| 4 | Lens 2 | −56.846900 (ASP) | 0.250 | Plastic | 1.634 | 23.8 | −8.35 |
| 5 | | 5.849600 (ASP) | 0.818 | | | | |
| 6 | Lens 3 | −7.250600 (ASP) | 0.696 | Plastic | 1.544 | 55.9 | −46.20 |
| 7 | | −10.534200 (ASP) | 0.511 | | | | |
| 8 | Lens 4 | −1.376090 (ASP) | 0.280 | Plastic | 1.640 | 23.3 | −10.20 |
| 9 | | −1.882000 (ASP) | 0.050 | | | | |
| 10 | Lens 5 | 5.201300 (ASP) | 0.750 | Plastic | 1.544 | 55.9 | 2.73 |
| 11 | | −1.976570 (ASP) | 0.408 | | | | |
| 12 | Lens 6 | −8.818400 (ASP) | 0.464 | Plastic | 1.544 | 55.9 | −2.83 |
| 13 | | 1.898790 (ASP) | 0.700 | | | | |
| 14 | IR-filter | Plano | 0.300 | Glass | 1.517 | 64.2 | — |
| 15 | | Plano | 0.623 | | | | |
| 16 | Image | Plano | — | | | | |

Note:
Reference wavelength (d-line) is 587.6 nm.

TABLE 8

Aspheric Coefficients

| Surface # | 1 | 2 | 4 | 5 | 6 | 7 |
|---|---|---|---|---|---|---|
| k = | 2.34180E−01 | −1.00000E+00 | 5.00000E+01 | −3.72848E+01 | −1.00000E+00 | −1.00000E+00 |
| A4 = | 9.50135E−04 | −4.57747E−02 | −9.34539E−02 | −3.43796E−02 | −8.81044E−02 | −5.44824E−02 |
| A6 = | −6.46013E−03 | 4.68111E−02 | 1.33853E−01 | 8.42076E−02 | −5.19092E−03 | −1.16818E−02 |
| A8 = | 1.19657E−02 | −1.27142E−02 | −7.54855E−02 | −5.10469E−02 | −2.33371E−03 | 2.16215E−03 |
| A10 = | −1.65436E−02 | −2.67420E−02 | 1.84707E−03 | 1.48803E−02 | 5.03008E−03 | 1.28034E−03 |
| A12 = | 1.00436E−02 | 2.39372E−02 | 2.35061E−02 | 4.02000E−03 | −5.59321E−03 | −3.76793E−04 |
| A14 = | −3.62938E−03 | −6.51510E−03 | −7.34566E−03 | −4.19098E−04 | 1.86088E−03 | −1.46178E−05 |

| Surface # | 8 | 9 | 10 | 11 | 12 | 13 |
|---|---|---|---|---|---|---|
| k = | −1.77852E+00 | −4.74192E−01 | −3.52008E+00 | −8.42345E+00 | −5.92639E+00 | −9.35521E+00 |
| A4 = | 1.47854E−01 | 7.48663E−02 | −8.86758E−02 | −3.02719E−02 | −3.90967E−02 | −3.02174E−02 |
| A6 = | −1.86022E−01 | −5.83257E−02 | 4.19462E−02 | 3.27576E−03 | 9.24067E−03 | 5.75746E−03 |
| A8 = | 1.22187E−01 | 3.32244E−02 | −1.40699E−02 | 6.41188E−03 | −7.26443E−04 | −8.80990E−04 |
| A10 = | −5.88349E−02 | −1.51805E−02 | 2.08031E−03 | −3.29038E−03 | −8.44041E−08 | 7.77184E−05 |
| A12 = | 1.67904E−02 | 3.84141E−03 | −1.47739E−04 | 5.96324E−04 | 3.03434E−06 | −3.54631E−06 |
| A14 = | −1.99536E−03 | −3.40047E−04 | 4.42940E−06 | −3.82576E−05 | −1.31230E−07 | 6.12582E−08 |

In the optical image capturing lens assembly according to the 4th embodiment, the definitions of f, Fno, HFOV, V1, V2, CT2, CT4, T12, T23, T34, T45, R1, R2, R7, R8, f2, f4, f5, f6, SAG42, Yc, Yd, EPD, TTL and ImgH are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 5.52 | (R7 − R8)/(R7 + R8) | −0.16 |
| Fno | 2.50 | f2/f4 | 0.82 |
| HFOV (deg.) | 34.5 | \|f/f5\| + \|f/f6\| | 3.97 |
| V1 − V2 | 32.5 | SAG42/CT4 | −2.77 |
| (CT2 + CT4)/f | 0.10 | Yc/Yd | 0.53 |
| (T12 + T45)/(T23 + T34) | 0.12 | f/EPD | 2.50 |
| \|R1/R2\| | 0.03 | TTL/ImgH | 1.67 |

5th Embodiment

Figure 9:
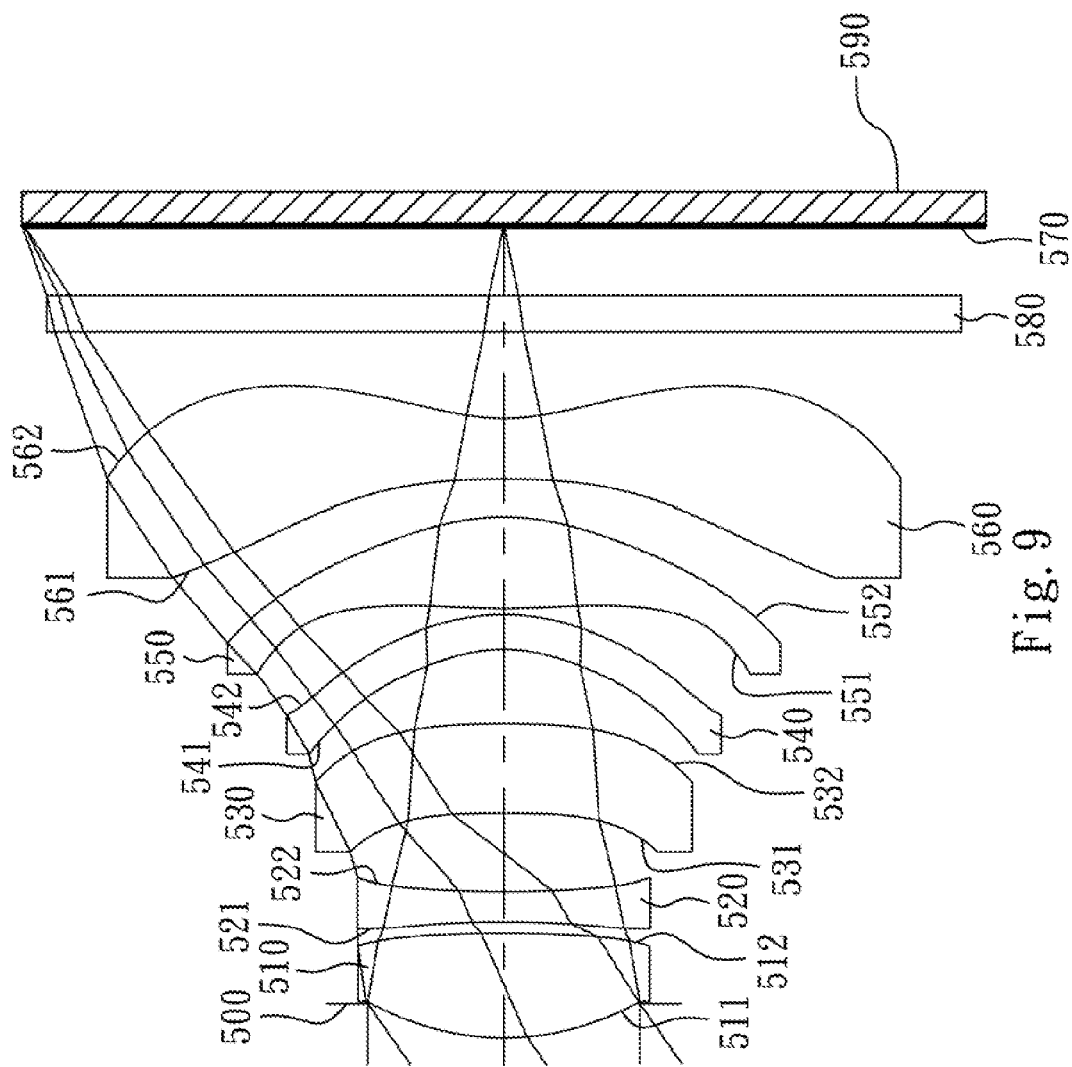
FIG. 9 is a schematic view of an optical image capturing lens assembly according to the 5th embodiment of the present disclosure.
Figure 10:
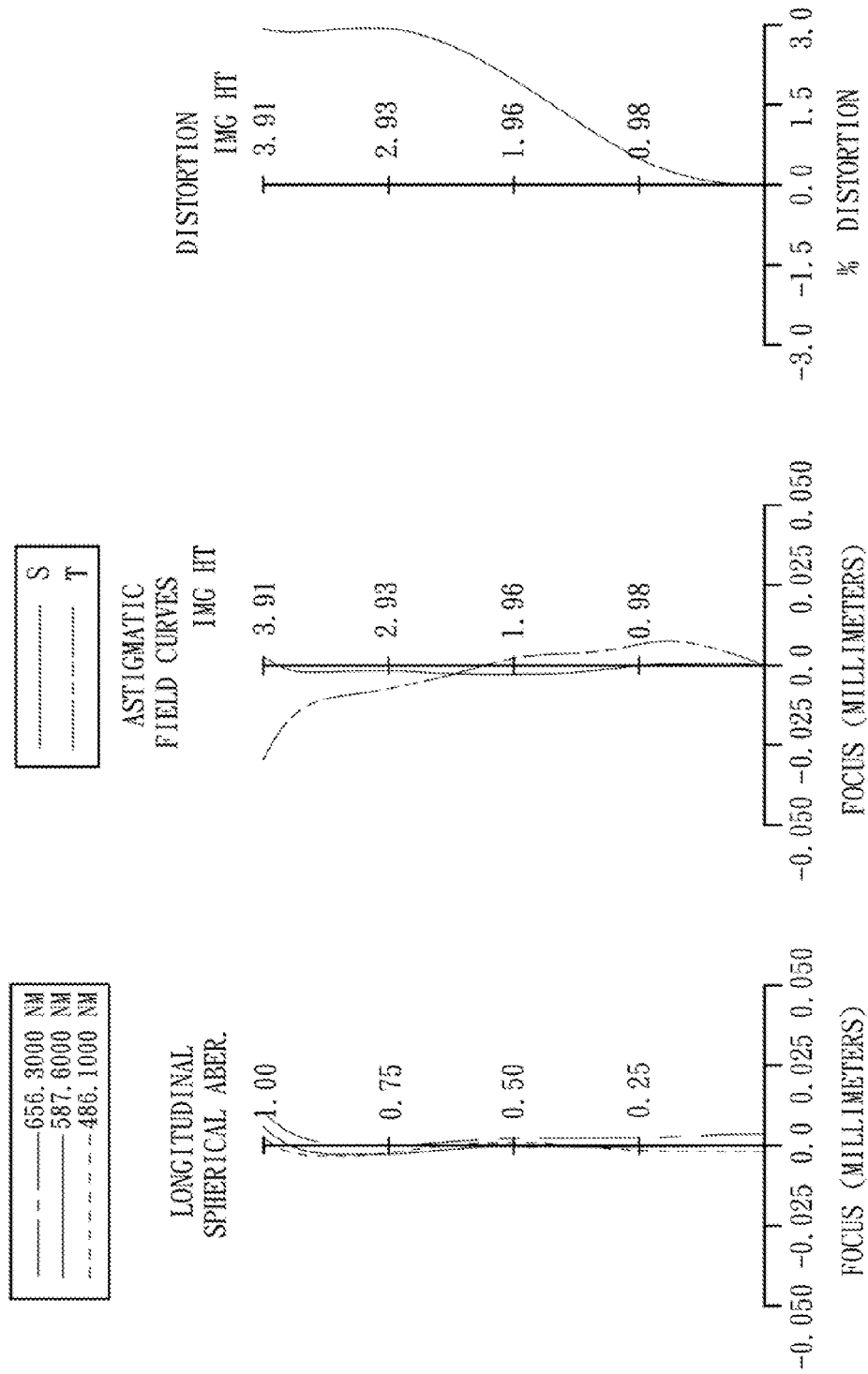
FIG. 10 shows spherical aberration curves, astigmatic field curves and a distortion curve of the optical image capturing lens assembly according to the 5th embodiment.

FIG. 9 is a schematic view of an optical image capturing lens assembly according to the 5th embodiment of the present disclosure. FIG. 10 shows spherical aberration curves, astigmatic field curves and a distortion curve of the optical image capturing lens assembly according to the 5th embodiment. In FIG. 9, the optical image capturing lens assembly includes, in order from an object side to an image side, an aperture stop 500, the first lens element 510, the second lens element 520, the third lens element 530, the fourth lens element 540, the fifth lens element 550, the sixth lens element 560, an IR-filter 580, an image plane 570 and an image sensor 590, wherein the aperture stop 500 is a front stop which located between an object and the first lens element 510.

The first lens element 510 with positive refractive power has a convex object-side surface 511 and a convex image-side surface 512, and is made of plastic material. The object-side surface 511 and the image-side surface 512 of the first lens element 510 are aspheric.

The second lens element 520 with negative refractive power has a concave object-side surface 521 and a concave image-side surface 522, and is made of plastic material. The object-side surface 521 and the image-side surface 522 of the second lens element 520 are aspheric.

The third lens element 530 with positive refractive power has a concave object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a convex image-side surface 542, and is made of plastic material. The object-side surface 541 and the image-side surface 542 of the fourth lens element 540 are aspheric.

The fifth lens element 550 with positive refractive power has a convex object-side surface 551 and a convex image-side surface 552, and is made of plastic material. The object-side surface 551 and the image-side surface 552 of the fifth lens element 550 are aspheric.

The sixth lens element 560 with negative refractive power has a concave object-side surface 561 and a concave image-side surface 562, and is made of plastic material. The object-side surface 561 and the image-side surface 562 to of the sixth lens element 560 are aspheric. Furthermore, the sixth lens element 560 has inflection points formed on the object-side surface 561 and the image-side surface 562 thereof.

The IR-filter 580 is made of glass material, wherein the IR-filter 580 is located between the sixth lens element 560 and the image plane 570, and will not affect the focal length of the optical image capturing lens assembly.

The detailed optical data of the 5th embodiment are shown in Table 9 and the aspheric surface data are shown in Table 10 below.

TABLE 9

5th Embodiment
f = 5.44 mm, Fno = 2.45, HFOV, 35.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.280 | | | | |
| 2 | Lens 1 | 2.171280 (ASP) | 0.854 | Plastic | 1.544 | 55.9 | 3.60 |
| 3 | | −17.482500 (ASP) | 0.095 | | | | |
| 4 | Lens 2 | −12.500000 (ASP) | 0.250 | Plastic | 1.640 | 23.3 | −7.57 |
| 5 | | 7.966500 (ASP) | 0.636 | | | | |
| 6 | Lens 3 | −10.282000 (ASP) | 0.731 | Plastic | 1.544 | 55.9 | 51.84 |
| 7 | | −7.724300 (ASP) | 0.611 | | | | |
| 8 | Lens 4 | −1.256910 (ASP) | 0.280 | Plastic | 1.640 | 23.3 | −10.38 |
| 9 | | −1.685810 (ASP) | 0.050 | | | | |
| 10 | Lens 5 | 6.196800 (ASP) | 0.750 | Plastic | 1.544 | 55.9 | 2.68 |
| 11 | | −1.822730 (ASP) | 0.306 | | | | |
| 12 | Lens 6 | −7.164800 (ASP) | 0.501 | Plastic | 1.544 | 55.9 | −2.50 |
| 13 | | 1.717430 (ASP) | 0.700 | | | | |
| 14 | IR-filter | Plano | 0.300 | Glass | 1.517 | 64.2 | — |
| 15 | | Plano | 0.571 | | | | |
| 16 | Image | Plano | — | | | | |

Note:
Reference wavelength (d-line) is 587.6 nm.

TABLE 10

Aspheric Coefficients

| Surface # | 2 | 3 | 4 | 5 | 6 | 7 |
|---|---|---|---|---|---|---|
| k = | 1.64565E−01 | −1.00000E+00 | −5.00000E+01 | −7.46990E+01 | −1.00000E+00 | −1.00000E+00 |
| A4 = | −3.14167E−04 | −4.92715E−02 | −8.94354E−02 | −3.95349E−02 | −8.22272E−02 | −4.29025E−02 |
| A6 = | −8.46548E−03 | 4.57610E−02 | 1.36895E−01 | 8.45292E−02 | −7.43663E−03 | −1.17715E−02 |
| A8 = | 1.19636E−02 | −1.28302E−02 | −7.68917E−02 | −5.21843E−02 | −2.52959E−03 | 1.99724E−03 |
| A10 = | −1.64787E−02 | −2.87535E−02 | −1.57916E−03 | 1.31039E−02 | 5.12519E−03 | 1.18130E−03 |
| A12 = | 9.89954E−03 | 2.23738E−02 | 2.11225E−02 | 3.23546E−03 | −5.93546E−03 | −3.96850E−04 |
| A14 = | −3.27519E−03 | −5.27815E−03 | −5.82976E−03 | −7.06826E−04 | 2.02286E−03 | −7.58004E−06 |

| Surface # | 8 | 9 | 10 | 11 | 12 | 13 |
|---|---|---|---|---|---|---|
| k = | −1.65525E+00 | −5.48951E−01 | −1.06498E+01 | −7.90727E+00 | −4.78947E+00 | −9.04532E+00 |
| A4 = | 1.47088E−01 | 7.58604E−02 | −9.05907E−02 | −3.10295E−02 | −4.07921E−02 | −3.00099E−02 |
| A6 = | −1.83825E−01 | −5.71037E−02 | 4.26649E−02 | 2.08400E−03 | 9.17998E−03 | 5.82469E−03 |
| A8 = | 1.22958E−01 | 3.35444E−02 | −1.42043E−02 | 6.56236E−03 | −7.30836E−04 | −8.85789E−04 |
| A10 = | −5.88180E−02 | −1.50888E−02 | 2.05352E−03 | −3.28956E−03 | 2.98991E−07 | 7.65081E−05 |
| A12 = | 1.67482E−02 | 3.83875E−03 | −1.43183E−04 | 5.96418E−04 | 3.07750E−06 | −3.59190E−06 |
| A14 = | −2.01003E−03 | −3.47320E−04 | 3.68108E−06 | −3.85082E−05 | −1.30838E−07 | 6.62202E−08 |

In the optical image capturing lens assembly according to the 5th embodiment, the definitions of f, Fno, HFOV, V1, V2, CT2, CT4, T12, T23, T34, T45, R1, R2, R7, R8, f2, f4, f5, f6, SAG42, Yc, Yd, EPD, TTL and ImgH are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 5.44 | (R7 − R8)/(R7 + R8) | −0.15 |
| Fno | 2.45 | f2/f4 | 0.73 |
| HFOV (deg.) | 35.0 | \|f/f5\| + \|f/f6\| | 4.21 |
| V1 − V2 | 32.6 | SAG42/CT4 | −2.93 |
| (CT2 + CT4)/f | 0.10 | Yc/Yd | 0.55 |
| (T12 + T45)/(T23 + T34) | 0.12 | f/EPD | 2.45 |
| \|R1/R2\| | 0.12 | TTL/ImgH | 1.67 |

6th Embodiment

Figure 11:
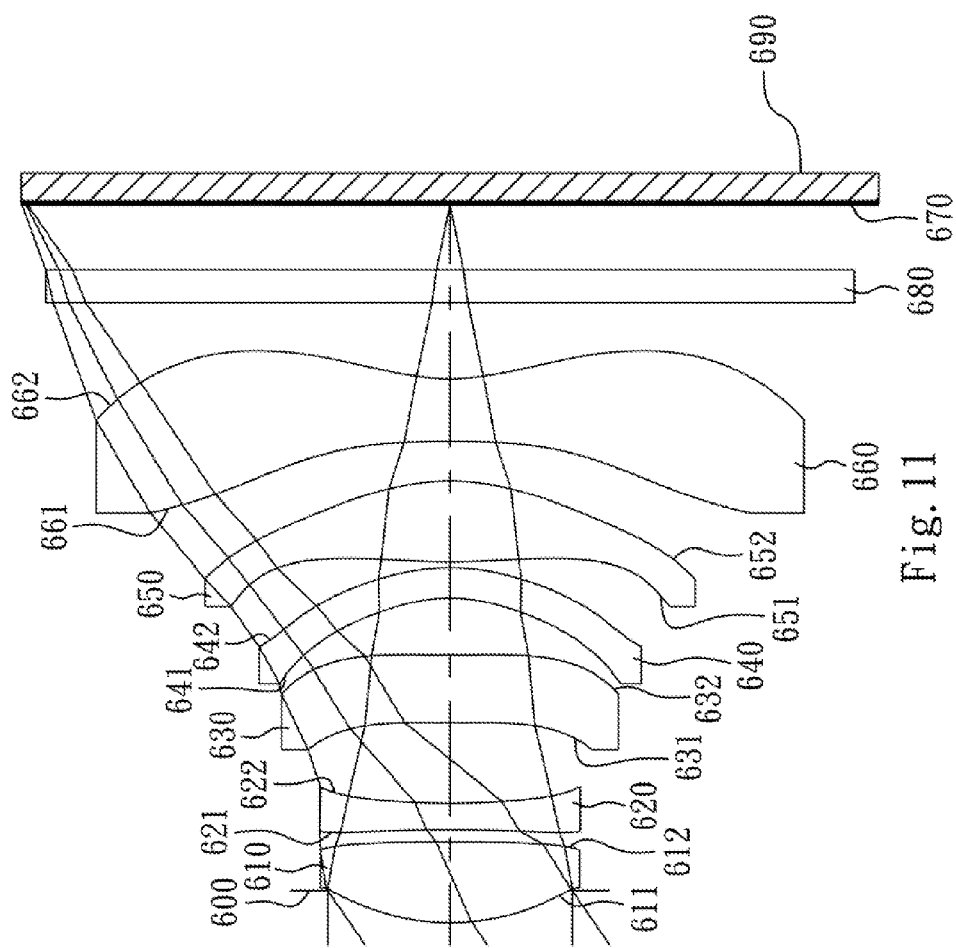
FIG. 11 is a schematic view of an optical image capturing lens assembly according to the 6th embodiment of the present disclosure.
Figure 12:
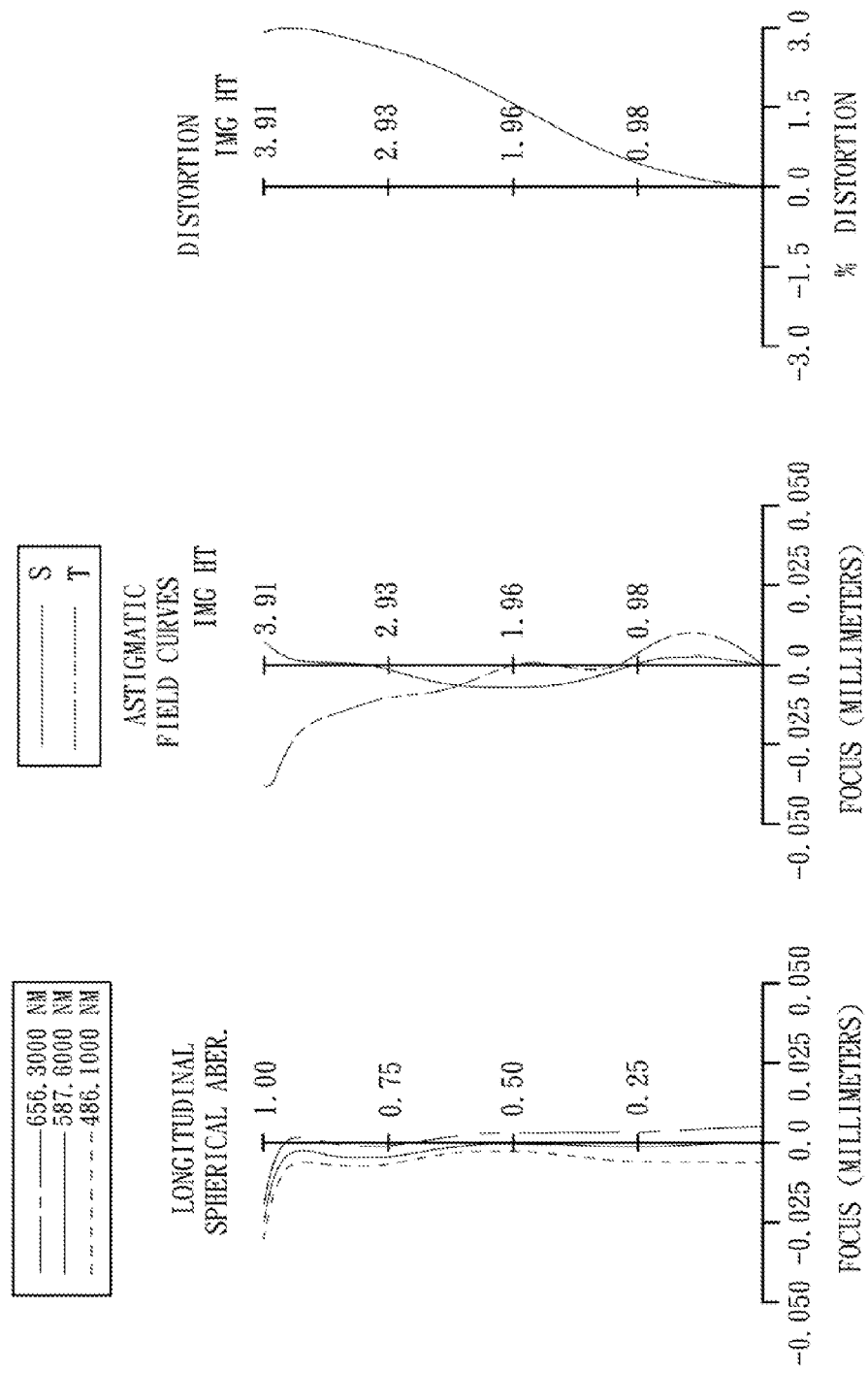
FIG. 12 shows spherical aberration curves, astigmatic field curves and a distortion curve of the optical image capturing lens assembly according to the 6th embodiment.

FIG. 11 is a schematic view of an optical image capturing lens assembly according to the 6th embodiment of the present disclosure. FIG. 12 shows spherical aberration curves, astigmatic field curves and a distortion curve of the optical image capturing lens assembly according to the 6th embodiment. In FIG. 11, the optical image capturing lens assembly includes, in order from an object side to an image side, an aperture stop 600, the first lens element 610, the second lens element 620, the third lens element 630, the fourth lens element 640, the fifth lens element 650, the sixth lens element 660, an IR-filter 680, an image plane 670 and an image sensor 690, wherein the aperture stop 600 is a front stop which located between an object and the first lens element 610.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a concave object-side surface 621 and a concave image-side surface 622, and is made of plastic material. The object-side surface 621 and the image-side surface 622 of the second lens element 620 are aspheric.

The third lens element 630 with negative refractive power has a convex object-side surface 631 and a concave image-side surface 632, and is made of plastic material. The object-side surface 631 and the image-side surface 632 of the third lens element 630 are aspheric.

The fourth lens element 640 with negative refractive power has a concave object-side surface 641 and a convex image-side surface 642, and is made of plastic material. The object-side surface 641 and the image-side surface 642 of the fourth lens element 640 are aspheric.

The fifth lens element 650 with positive refractive power has a convex object-side surface 651 and a convex image-side surface 652, and is made of plastic material. The object-side surface 651 and the image-side surface 652 of the fifth lens element 650 are aspheric.

The sixth lens element 660 with negative refractive power has a concave object-side surface 661 and a concave image-side surface 662, and is made of plastic material. The object-side surface 661 and the image-side surface 662 of the sixth lens element 660 are aspheric. Furthermore, the sixth lens element 660 has inflection points formed on the object-side surface 661 and the image-side surface 662 thereof.

The IR-filter 680 is made of glass material, wherein the IR-filter 680 is located between the sixth lens element 660 and the image plane 670, and will not affect the focal length of the optical image capturing lens assembly.

The detailed optical data of the 6th embodiment are shown in Table 11 and the aspheric surface data are shown in Table 12 below.

TABLE 11

6th Embodiment
f = 5.51 mm, Fno = 2.45, HFOV = 34.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.295 | | | | |
| 2 | Lens 1 | 2.115097 (ASP) | 0.744 | Plastic | 1.535 | 56.3 | 3.84 |
| 3 | | −60.890881 (ASP) | 0.110 | | | | |
| 4 | Lens 2 | −66.519328 (ASP) | 0.250 | Plastic | 1.640 | 23.3 | −8.36 |
| 5 | | 5.826338 (ASP) | 0.739 | | | | |
| 6 | Lens 3 | 100.813363 (ASP) | 0.625 | Plastic | 1.543 | 56.5 | −329.99 |
| 7 | | 64.391500 (ASP) | 0.528 | | | | |
| 8 | Lens 4 | −1.339418 (ASP) | 0.280 | Plastic | 1.607 | 26.6 | −9.21 |
| 9 | | −1.900346 (ASP) | 0.050 | | | | |
| 10 | Lens 5 | 5.763700 (ASP) | 0.750 | Plastic | 1.544 | 55.9 | 2.73 |
| 11 | | −1.911648 (ASP) | 0.359 | | | | |
| 12 | Lens 6 | −11.081024 (ASP) | 0.580 | Plastic | 1.544 | 55.9 | −2.85 |
| 13 | | 1.838177 (ASP) | 0.700 | | | | |
| 14 | IR-filter | Plano | 0.300 | Glass | 1.517 | 64.2 | — |
| 15 | | Plano | 0.620 | | | | |
| 16 | Image | Plano | — | | | | |

Note:
Reference wavelength (d-line) is 587.6 nm.

TABLE 12

Aspheric Coefficients

| Surface # | 2 | 3 | 4 | 5 | 6 | 7 |
|---|---|---|---|---|---|---|
| k = | 1.97811E−01 | −1.00000E+00 | 5.00000E+01 | −4.81644E+01 | −1.00000E+00 | −1.00000E+00 |
| A4 = | −6.98272E−04 | −4.66339E−02 | −9.13190E−02 | −3.26050E−02 | −8.24418E−02 | −4.69286E−02 |
| A6 = | −8.55217E−03 | 4.43957E−02 | 1.35677E−01 | 8.45741E−02 | −3.25886E−03 | −1.11284E−02 |
| A8 = | 1.21652E−02 | −1.34393E−02 | −7.48983E−02 | −5.30331E−02 | −1.07281E−03 | 1.87339E−03 |
| A10 = | −1.65263E−02 | −2.59747E−02 | −2.30708E−03 | 1.42887E−02 | 4.92893E−03 | 9.08524E−04 |
| A12 = | 9.88918E−03 | 2.31452E−02 | 2.36024E−02 | 3.63139E−03 | −5.80182E−03 | −4.31597E−04 |
| A14 = | −3.42223E−03 | −6.74126E−03 | −7.32693E−03 | −1.06009E−03 | 1.92300E−03 | −1.07888E−05 |

| Surface # | 8 | 9 | 10 | 11 | 12 | 13 |
|---|---|---|---|---|---|---|
| k = | −1.78865E+00 | −4.95775E−01 | −8.14364E+00 | −7.94914E+00 | −2.38632E+00 | −8.79790E+00 |
| A4 = | 1.57954E−01 | 7.50053E−02 | −8.17911E−02 | −2.92034E−02 | −4.16688E−02 | −3.01336E−02 |
| A6 = | −1.84976E−01 | −5.78709E−02 | 4.16204E−02 | 4.10224E−03 | 9.27473E−03 | 5.89269E−03 |
| A8 = | 1.21933E−01 | 3.32750E−02 | −1.41084E−02 | 6.31461E−03 | −7.15165E−04 | −8.96223E−04 |
| A10 = | −5.87519E−02 | −1.51600E−02 | 2.04977E−03 | −3.30600E−03 | 1.17871E−06 | 7.78846E−05 |
| A12 = | 1.66906E−02 | 3.83790E−03 | −1.37787E−04 | 5.96212E−04 | 3.07797E−06 | −3.54179E−06 |
| A14 = | −2.03427E−03 | −3.39874E−04 | 2.56969E−06 | −3.81295E−05 | −1.53202E−07 | 6.30234E−08 | in the optical image capturing lens assembly according to the 6th embodiment, the definitions of f, Fno, HFOV, V1, V2, CT2, CT4, T12, T23, T34, T45, R1, R2, R7, R8, f2, f4, f5, f6, SAG42, Yc, Yd, EPS, TTL and ImgH are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 5.51 | (R7 − R8)/(R7 + R8) | −0.17 |
| Fno | 2.45 | f2/f4 | 0.91 |
| HFOV (deg.) | 34.6 | \|f/f5\| + \|f/f6\| | 3.95 |
| V1 − V2 | 33.0 | SAG42/CT4 | −2.61 |
| (CT2 + CT4)/f | 0.10 | Yc/Yd | 0.54 |
| (T12 + T45)/(T23 + T34) | 0.13 | f/EPD | 2.45 |
| \|R1/R2\| | 0.03 | TTL/ImgH | 1.67 |

7th Embodiment

Figure 13:
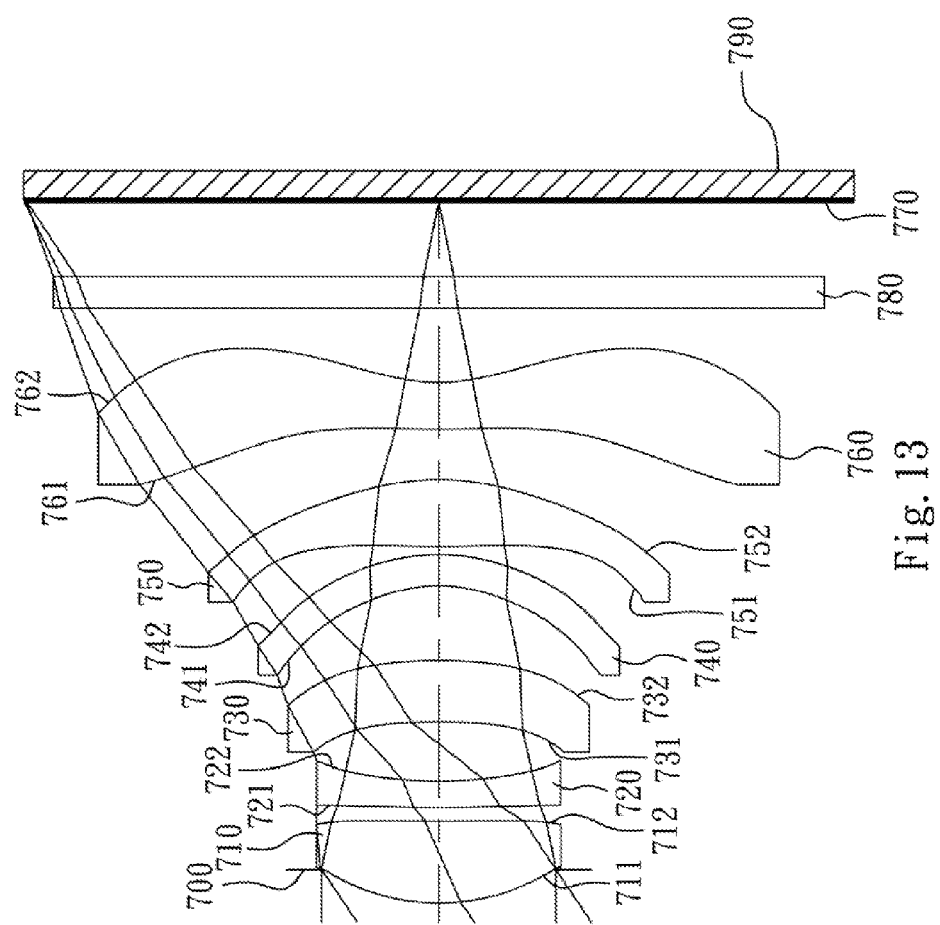
FIG. 13 is a schematic view of an optical image capturing lens assembly according to the 7th embodiment of the present disclosure.
Figure 14:
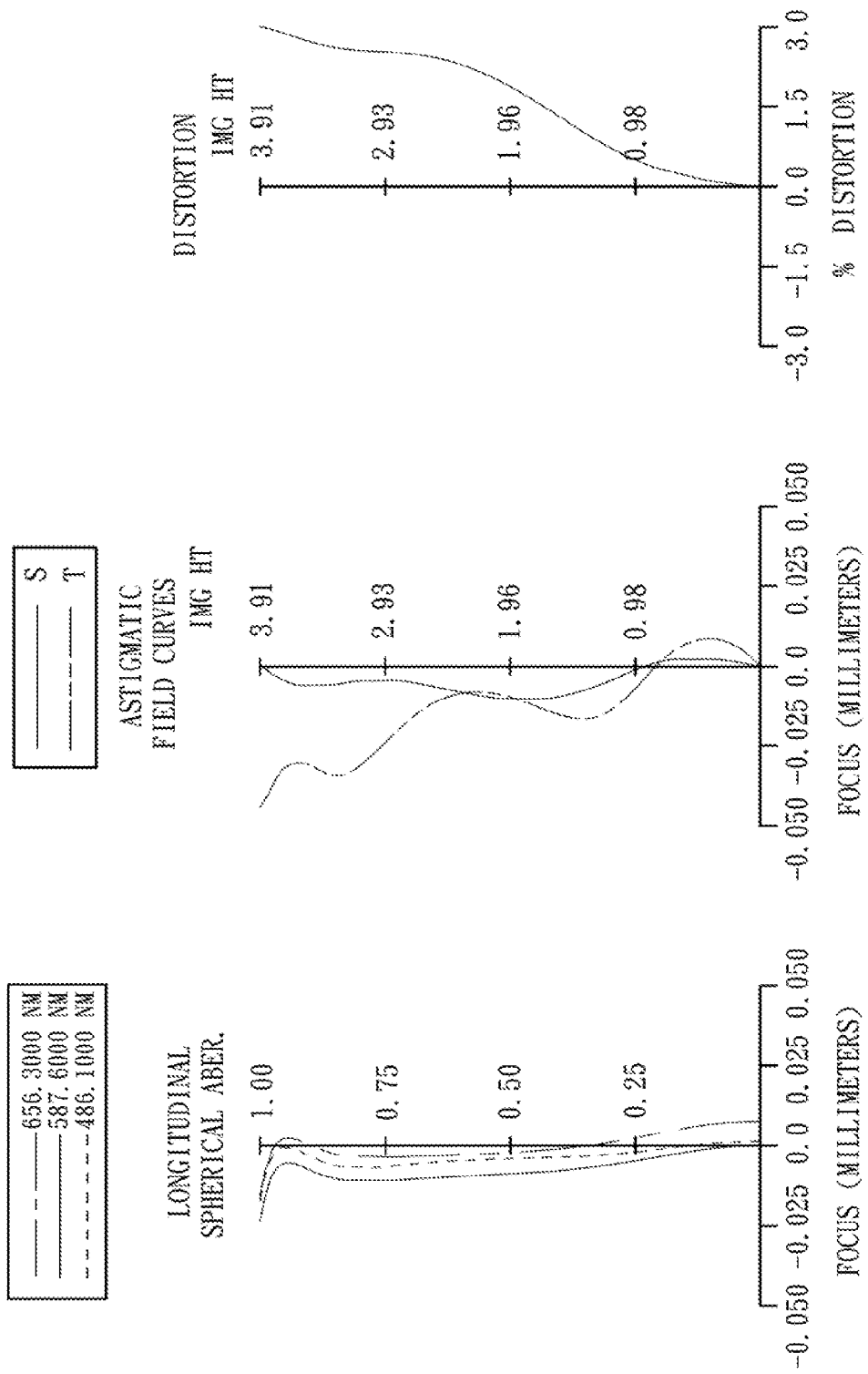
FIG. 14 shows spherical aberration curves, astigmatic field curves and a distortion curve of the optical image capturing lens assembly according to the 7th embodiment.

FIG. 13 is a schematic view of an optical image capturing lens assembly according to the 7th embodiment of the present disclosure. FIG. 14 shows spherical aberration curves, astigmatic field curves and a distortion curve of the optical image capturing lens assembly according to the 7th embodiment. In FIG. 13, the optical image capturing lens assembly includes, in order from an object side to an image side, an aperture stop 700, the first lens element 710, the second lens element 720, the third lens element 730, the fourth lens element 740, the fifth lens element 750, the sixth lens element 760, an IR-filter 780, an image plane 770 and an image sensor 790, wherein the aperture stop 700 is a front stop which located between an object and the first lens element 710.

The first lens element 710 with positive refractive power has a convex object-side surface 711 and a concave image-side surface 712, and is made of plastic material. The object-side surface 711 and the image-side surface 712 of the first lens element 710 are aspheric.

The second lens element 720 with negative refractive power has a convex object-side surface 721 and a concave image-side surface 722, and is made of plastic material. The object-side surface 721 and the image-side surface 722 of the second lens element 720 are aspheric.

The third lens element 730 with positive refractive power has a concave object-side surface 731 and a convex image-side surface 732, and is made of plastic material. The object-side surface 731 and the image-side surface 732 of the third lens element 730 are aspheric.

The fourth lens element 740 with negative refractive power has a concave object-side surface 741 and a convex image-side surface 742, and is made of plastic material. The object-side surface 741 and the image-side surface 742 of the fourth lens element 740 are aspheric.

The fifth lens element 750 with positive refractive power has a convex object-side surface 751 and a convex image-side surface 752, and is made of plastic material. The object-side surface 751 and the image-side surface 752 of the fifth lens element 750 are aspheric.

The sixth lens element 760 with negative refractive power has a convex object-side surface 761 and a concave image-side surface 762, and is made of plastic material. The object-side surface 761 and the image-side surface 762 of the sixth lens element 760 are aspheric. Furthermore, the sixth lens element 760 has inflection points formed on the object-side surface 761 and the image-side surface 762 thereof.

The IR-filter 780 is made of glass material, wherein the IR-filter 780 is located between the sixth lens element 760 and the image plane 770, and will not affect the focal length of the optical image capturing lens assembly.

The detailed optical data of the 7th embodiment are shown in Table 13 and the aspheric surface data are shown in Table 14 below.

TABLE 13

7th Embodiment
f = 5.63 mm, Fno = 2.55, HFOV = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.315 | | | | |
| 2 | Lens 1 | 2.023364 (ASP) | 0.771 | Plastic | 1.530 | 55.8 | 4.04 |

TABLE 13-continued

7th Embodiment
f = 5.63 mm, Fno = 2.55, HFOV = 34.0 deg.

| Surface # | | Curvature Radius | Thickness | Material | Index | Abbe # | Focal length |
|---|---|---|---|---|---|---|---|
| 3 | | 32.259952 (ASP) | 0.132 | | | | |
| 4 | Lens 2 | 9.449957 (ASP) | 0.250 | Plastic | 1.650 | 21.4 | −8.85 |
| 5 | | 3.537988 (ASP) | 0.556 | | | | |
| 6 | Lens 3 | −6.448415 (ASP) | 0.582 | Plastic | 1.530 | 55.8 | 35.76 |
| 7 | | −4.961605 (ASP) | 0.706 | | | | |
| 8 | Lens 4 | −1.287730 (ASP) | 0.295 | Plastic | 1.650 | 21.4 | −9.60 |
| 9 | | −1.769275 (ASP) | 0.070 | | | | |
| 10 | Lens 5 | 8.841707 (ASP) | 0.635 | Plastic | 1.530 | 55.8 | 3.32 |
| 11 | | −2.144522 (ASP) | 0.473 | | | | |
| 12 | Lens 6 | 12.820513 (ASP) | 0.440 | Plastic | 1.530 | 55.8 | −3.42 |
| 13 | | 1.570346 (ASP) | 0.700 | | | | |
| 14 | IR-filter | Plano | 0.300 | Glass | 1.517 | 64.2 | — |
| 15 | | Plano | 0.722 | | | | |
| 16 | Image | Plano | — | | | | |

Note:
Reference wavelength (d-line) is 587.6 nm.

TABLE 14

Aspheric Coefficients

| Surface # | 2 | 3 | 4 | 5 | 6 | 7 |
|---|---|---|---|---|---|---|
| k = | 2.59665E−01 | −1.00000E+00 | −2.89526E+01 | −1.82997E+01 | −1.00000E+00 | −1.00000E+00 |
| A4 = | 8.43394E−05 | −3.94344E−02 | −9.70345E−02 | −2.86117E−02 | −7.91510E−02 | −4.43022E−02 |
| A6 = | −6.58281E−03 | 4.37983E−02 | 1.33975E−01 | 8.56840E−02 | −7.77148E−03 | −1.05731E−02 |
| A8 = | 1.25885E−02 | −1.56098E−02 | −7.47482E−02 | −5.29805E−02 | 2.39837E−04 | 2.67464E−03 |
| A10 = | −1.66406E−02 | −2.55775E−02 | −3.57395E−03 | 1.42653E−02 | 5.77263E−03 | 1.11472E−03 |
| A12 = | 1.08772E−02 | 2.37757E−02 | 2.29013E−02 | 3.42273E−03 | −6.67915E−03 | −4.41976E−04 |
| A14 = | −3.74480E−03 | −8.08236E−03 | −8.52593E−03 | −1.27936E−03 | 1.38065E−03 | −8.71899E−05 |

| Surface # | 8 | 9 | 10 | 11 | 12 | 13 |
|---|---|---|---|---|---|---|
| k = | −1.60994E+00 | −4.45646E−01 | −3.86538E+01 | −9.93460E+00 | −1.00000E+00 | −6.20846E+00 |
| A4 = | 1.41314E−01 | 7.11645E−02 | −8.43312E−02 | −2.67922E−02 | −5.26529E−02 | −3.33790E−02 |
| A6 = | −1.86935E−01 | −6.02009E−02 | 4.10163E−02 | 1.53677E−02 | 9.51974E−03 | 6.13926E−03 |
| A8 = | 1.22331E−01 | 3.30779E−02 | −1.41375E−02 | 6.21595E−03 | −7.08344E−04 | −9.02229E−04 |
| A10 = | −5.87355E−02 | −1.51063E−02 | 1.98904E−03 | −3.27966E−03 | 1.43380E−06 | 7.77887E−05 |
| A12 = | 1.67381E−02 | 3.86235E−03 | −1.45339E−04 | 5.99908E−04 | 3.11537E−06 | −3.50535E−06 |
| A14 = | −1.97537E−03 | −3.29963E−04 | 6.48457E−06 | −3.74350E−05 | −1.45544E−07 | 5.89261E−08 |

In the optical image capturing lens assembly according to the 7th embodiment, the definitions of f, Fno, HFOV, V1, V2, CT2, CT4, T12, T23, T34, T45, R1, R2, R7, R8, f2, f4, f5, f6, SAG42, Yc, Yd, EPD, TTL and ImgH are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 5.63 | (R7 − R8)/(R7 + R8) | −0.16 |
| Fno | 2.55 | f2/f4 | 0.92 |
| HFOV (deg.) | 34.0 | $\|f/f5\| + \|f/f6\|$ | 3.34 |
| V1 − V2 | 34.4 | SAG42/CT4 | −2.93 |
| (CT2 + CT4)/f | 0.10 | Yc/Yd | 0.57 |
| (T12 + T45)/(T23 + T34) | 0.16 | f/EPD | 2.55 |
| \|R1/R2\| | 0.06 | TTL/ImgH | 1.67 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image capturing lens assembly comprising, in order from an object side to an image side:
   a first lens element with positive refractive power having a convex object-side surface;
   a second lens element with refractive power;
   a third lens element with refractive power;
   a fourth lens element with refractive power having a concave object-side surface and a convex image-side surface;
   a fifth lens element with refractive power having a convex image-side surface, wherein an object-side surface and the image-side surface of the fifth lens element are aspheric; and
   a sixth lens element with negative refractive power made of plastic material and having a concave image-side surface, wherein an object-side surface and the image-side surface of the sixth lens element are aspheric, and the sixth lens element has at least one inflection point formed on at least one of the object-side surface and the image-side surface thereof;

wherein a distance in parallel with an optical axis from a maximum effective diameter position to an axial vertex on the image-side surface of the fourth lens element is SAG42, a central thickness of the fourth lens element is CT4, a distance perpendicular to the optical axis between a non-axial critical point on the image-side surface of the sixth lens element and the optical axis is Yc, and a distance perpendicular to the optical axis between the maximum effective diameter position and the optical axis is Yd, the following relationships are satisfied:

$-5.0 < SAG42/CT4 < -1.4$; and $0.2 < Yc/Yd < 0.9$.

2. The optical image capturing lens assembly of claim 1, wherein the second lens element has negative refractive power.

3. The optical image capturing lens assembly of claim 2, wherein the fifth lens element has positive refractive power, and the optical image capturing lens assembly further comprises:
a stop located between an object and the first lens element.

4. The optical image capturing lens assembly of claim 3, wherein a focal length of the optical image capturing lens assembly is f, a focal length of the fifth lens element is f5, and a focal length of the sixth lens element is f6, the following relationship is satisfied:

$3.0 < |f/f5| + |f/f6| < 6.5$.

5. The optical image capturing lens assembly of claim 4, wherein the second lens element has a concave image-side surface, a curvature radius of the object-side surface of the fourth lens element is R7, and a curvature radius of the image-side surface of the fourth lens element is R8, the following relationship is satisfied:

$-0.3 < (R7-R8)/(R7+R8) < -0.05$.

6. The optical image capturing lens assembly of claim 3, wherein an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following relationship is satisfied:

$0.05 < (T12+T45)/(T23+T34) < 0.30$.

7. The optical image capturing lens assembly of claim 2, wherein the third lens element has positive refractive power, the sixth lens element has a concave object-side surface, a maximum image height of the optical image capturing lens assembly is ImgH, and an axial distance between the object-side surface of the first lens element and an image plane is TTL, the following relationship is satisfied:

$TTL/ImgH < 1.8$.

8. The optical image capturing lens assembly of claim 7, wherein a focal length of the optical image capturing lens assembly is f, a central thickness of the second lens element is CT2, and the central thickness of the fourth lens element is CT4, the following relationship is satisfied:

$0.03 < (CT2+CT4)/f < 0.15$.

9. The optical image capturing lens assembly of claim 2, wherein the distance in parallel with an optical axis from a maximum effective diameter position to an axial vertex on the image-side surface of the fourth lens element is SAG42, and the central thickness of the fourth lens element is CT4, the following relationship is satisfied:

$-4.5 < SAG42/CT4 < -1.7$.

10. The optical image capturing lens assembly of claim 9, wherein a curvature radius of an object-side surface of the first lens element is R1, and a curvature radius of an image-side surface of the first lens element is R2, the following relationship is satisfied:

$0 < |R1/R2| < 0.3$.

11. The optical image capturing lens assembly of claim 10, wherein the object-side surfaces and the image-side surfaces of the first through fourth lens elements are aspheric, the fifth lens element has a convex object-side surface, an Abbe number of the first lens element is V1, and an Abbe number of the second lens element is V2, the following relationship is satisfied:

$25 < V1 - V2 < 42$.

12. The optical image capturing lens assembly of claim 10, wherein the distance perpendicular to the optical axis between a non-axial critical point on the image-side surface of the sixth lens element and the optical axis is Yc, and the distance perpendicular to the optical axis between the maximum effective diameter position and the optical axis is Yd, the following relationship is satisfied:

$0.45 < Yc/Yd < 0.70$.

13. The optical image capturing lens assembly of claim 9, wherein the fourth lens element has negative refractive power, and the object-side surfaces and the image-side surfaces of the first through fourth lens elements are aspheric.

14. The optical image capturing lens assembly of claim 13, wherein a focal length of the optical image capturing lens assembly is f, and an entrance pupil diameter of the optical image capturing lens assembly is EPD, the following relationship is satisfied:

$1.5 < f/EPD < 2.5$.

15. An optical image capturing lens assembly comprising, in order from an object side to an image side:
a first lens element with positive refractive power having a convex object-side surface;
a second lens element with negative refractive power;
a third lens element with refractive power;
a fourth lens element with refractive power;
a fifth lens element with positive refractive power made of plastic material, wherein an object-side surface and an image-side surface of the fifth lens element are aspheric; and
a sixth lens element with negative refractive power made of plastic material and having a concave image-side surface, wherein an object-side surface and the image-side surface of the sixth lens element are aspheric, and the sixth lens element has at least one inflection point formed on at least one of the object-side surface and the image-side surface thereof;

wherein the first through sixth lens elements are six independent and non-cemented lens elements, a focal length of the optical image capturing lens assembly is f, are entrance pupil diameter of the optical image capturing lens assembly is EPD, a distance perpendicular to the optical axis between a non-axial critical point on the image-side surface of the sixth lens element and the optical axis is Yc, and a distance perpendicular to the optical axis between the maximum effective diameter position and the optical axis is Yd, the following relationships are satisfied:

$1.5 < f/EPD < 2.5$; and $0.2 < Yc/Yd < 0.9$.

16. The optical image capturing lens assembly of claim 15, wherein the second lens element has a concave image-side surface, the fourth lens element has a concave object-side surface and a convex image-side surface.

17. The optical image capturing lens assembly of claim 16, wherein the fifth lens element has a convex image-side surface, a distance in parallel with an optical axis from a maximum effective diameter position to an axial vertex on the image-side surface of the fourth lens element is SAG42, and a central thickness of the fourth lens element is CT4, the following relationship is satisfied:

$-4.5 < SAG42/CT4 < -1.7$.

18. The optical image capturing lens assembly of claim 15, further comprising:
   a stop located between an object and the first lens element;
   wherein the focal length of the optical image capturing lens assembly is f, the entrance pupil diameter of the optical image capturing lens assembly is EPD, an Abbe number of the first lens element is V1, and an Abbe number of the second lens element is V2, the following relationships are satisfied:

$1.7 < f/EPD < 2.2$; and $25 < V1-V2 < 42$.

19. The optical image capturing lens assembly of claim 16, wherein the fifth lens element has a convex image-side surface, an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following relationship is satisfied:

$0.05 < (T12+T45)/(T23+T34) < 0.30$.

20. The optical image capturing lens assembly of claim 19, wherein the third lens element has positive refractive power, the fourth lens element has negative refractive power, and the object-side surfaces and the image-side surfaces of the first through fourth lens elements are aspheric.

21. The optical image capturing lens assembly of claim 19, wherein a focal length of the second lens element is f2, and a focal length of the fourth lens element is f4, the following relationship is satisfied:

$0.5 < f2/f4 < 1.3$.

22. An optical image capturing lens assembly comprising, in order from an object side to an image side:
   a first lens element with positive refractive power having a convex object-side surface;
   a second lens element with refractive power;
   a third lens element with refractive power;
   a fourth lens element with refractive power having a concave object-side surface and a convex image-side surface;
   a fifth lens element with refractive power made of plastic material and having a convex image-side surface, wherein an object-side surface and the image-side surface of the fifth lens element are aspheric; and
   a sixth lens element with negative refractive power made of plastic material and having a concave image-side surface, wherein an object-side surface and the image-side surface of the sixth lens element are aspheric, and the sixth lens element has at least one inflection point formed on at least one of the object-side surface and the image-side surface thereof;
   wherein the first through sixth lens elements are six independent and non-cemented lens elements, a curvature radius of the object-side surface of the fourth lens element is R7, a curvature radius of the image-side surface of the fourth lens element is R8, a distance perpendicular to the optical axis between a non-axial critical point on the image-side surface of the sixth lens element and the optical axis is Yc, and a distance perpendicular to the optical axis between the maximum effective diameter position and the optical axis is Yd, the following relationships are satisfied:

$-0.3 < (R7-R8)/(R7+R8) < -0.05$; and $0.2 < Yc/Yd < 0.9$.

23. The optical image capturing lens assembly of claim 22, wherein a focal length of the optical image capturing lens assembly is f, a central thickness of the second lens element is CT2, and a central thickness of the fourth lens element is CT4, the following relationship is satisfied:

$0.03 < (CT2+CT4)/f < 0.15$.

24. The optical image capturing lens assembly of claim 22, wherein the curvature radius of the object-side surface of the fourth lens element is R7, and the curvature radius of the image-side surface of the fourth lens element is R8, the following relationship is satisfied:

$-0.2 < (R7-R8)/(R7+R8) < -0.1$.

25. The optical image capturing lens assembly of claim 22, wherein the second lens element has a concave image-side surface, an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, and the following relationship is satisfied:

$0.05 < (T12+T45)/(T23+T34) < 0.30$.

* * * * *

UNITED STATES PATENT AND TRADEMARK OFFICE
CERTIFICATE OF CORRECTION

PATENT NO. : 8,514,499 B2
APPLICATION NO. : 13/569172
DATED : August 20, 2013
INVENTOR(S) : Po-Lun Hsu et al.

It is certified that error appears in the above-identified patent and that said Letters Patent is hereby corrected as shown below:

In the Claims

Column 28, line 44-Column 29, line 9, Claim 15 should read:

15. An optical image capturing lens assembly comprising, in order from an object side to an image side:

a first lens element with positive refractive power having a convex object-side surface;

a second lens element with negative refractive power;

a third lens element with refractive power;

a fourth lens element with refractive power;

a fifth lens element with positive refractive power made of plastic material, wherein an object-side surface and an image-side surface of the fifth lens element are aspheric; and a sixth lens element with negative refractive power made of plastic material and having a concave image-side surface, wherein an object-side surface and the image-side surface of the sixth lens element are aspheric, and the sixth lens element has at least one inflection point formed on at least one of the object-side surface and the image-side surface thereof;

Signed and Sealed this
Eleventh Day of November, 2014

Michelle K. Lee
*Deputy Director of the United States Patent and Trademark Office* wherein the first through sixth lens elements are six independent and non-cemented lens elements, a focal length of the optical image capturing lens assembly is f, an entrance pupil diameter of the optical image capturing lens assembly is EPD, a distance perpendicular to the optical axis between a non-axial critical point on the image-side surface of the sixth lens element and the optical axis is Yc, and a distance perpendicular to the optical axis between the maximum effective diameter position and the optical axis is Yd, the following relationships are satisfied:

$1.5 < f/EPD < 2.5$ ; and $0.2 < Yc/Yd < 0.9$.